(12) United States Patent
Xi et al.

(10) Patent No.: US 11,021,561 B2
(45) Date of Patent: Jun. 1, 2021

(54) AMINE COMPOSITION USEFUL FOR MAKING POLYURETHANE FOAM

(71) Applicant: Evonik Operations GmbH, Essen (DE)

(72) Inventors: Kai Xi, Whitehouse Station, NJ (US); Juan Jesus Burdeniuc, Colmar, PA (US); Irene Joann Hsu, Bryn Mawr, PA (US); Renee Jo Keller, Orwigsburg, PA (US); Timothy Joseph Miller, Northampton, PA (US); Jared Denis Bender, Breinigsville, PA (US); Jane Kniss, Kempton, PA (US)

(73) Assignee: Evonik Operations GmbH, Essen (DE)

( * ) Notice: Subject to any disclaimer, the term of this patent is extended or adjusted under 35 U.S.C. 154(b) by 141 days.

(21) Appl. No.: 15/647,009

(22) Filed: Jul. 11, 2017

(65) Prior Publication Data
US 2018/0009930 A1    Jan. 11, 2018

Related U.S. Application Data

(60) Provisional application No. 62/360,543, filed on Jul. 11, 2016.

(51) Int. Cl.
| | | |
|---|---|---|
| C08G 18/20 | (2006.01) | |
| C08G 18/18 | (2006.01) | |
| C08G 18/22 | (2006.01) | |
| C08G 18/76 | (2006.01) | |
| C08G 18/48 | (2006.01) | |
| C08G 18/42 | (2006.01) | |

(52) U.S. Cl.
CPC ..... C08G 18/2027 (2013.01); C08G 18/1808 (2013.01); C08G 18/1858 (2013.01); C08G 18/2081 (2013.01); C08G 18/225 (2013.01); C08G 18/227 (2013.01); C08G 18/4208 (2013.01); C08G 18/4829 (2013.01); C08G 18/7671 (2013.01); C08G 2110/0008 (2021.01); C08G 2110/0025 (2021.01); C08G 2110/0058 (2021.01)

(58) Field of Classification Search
CPC ... B01J 27/24; B01J 31/0244; C08G 18/2018; C08G 18/2027; C08G 59/68; C08G 59/686; C07D 403/12
See application file for complete search history.

(56) References Cited

U.S. PATENT DOCUMENTS

| | | | | |
|---|---|---|---|---|
| 4,069,203 A * | 1/1978 | Carey | ............... | C08G 59/4215 525/504 |
| 5,786,402 A | 7/1998 | Bruchmann et al. | | |
| 7,572,837 B2 | 8/2009 | Kometani et al. | | |
| 8,637,584 B2 * | 1/2014 | Andrew | ............... | C08G 18/161 521/129 |
| 9,273,175 B2 * | 3/2016 | Burdeniuc | ............. | C08G 18/18 |
| 9,574,044 B2 * | 2/2017 | Tilak | ................... | C08G 18/6633 |
| 9,708,436 B2 * | 7/2017 | Burdeniuc | ............. | C08G 18/18 |
| 9,968,919 B2 * | 5/2018 | Burdeniuc | ........... | B01J 31/0237 |
| 10,023,681 B2 * | 7/2018 | Burdeniuc | ......... | C08G 18/5021 |
| 10,119,002 B2 * | 11/2018 | Burdeniuc | ......... | C08G 18/1825 |
| 10,196,476 B2 * | 2/2019 | Burdeniuc | ......... | C08G 18/5021 |
| 2005/0065295 A1 * | 3/2005 | Christiansen | ........ | C09D 163/00 525/523 |

(Continued)

FOREIGN PATENT DOCUMENTS

| | | | |
|---|---|---|---|
| CA | 1076747 A1 | * | 4/1980 |
| CN | 100436500 C | | 11/2008 |

(Continued)

OTHER PUBLICATIONS

Geibel, J. et al. Model compounds for R-state and T-state hemoglobins. J. Am. Chem. Soc. 1978, 100, 3575-3585. (Year: 1978).*
Connors, K. A. N-methylimidazole as a catalyst for analytical acetylations of hydroxy compounds. Anal. Chem. 1978, 50, 1542-1545. (Year: 1978).*
Machine Translation of JP2011-207854A. Oct. 20, 2011. (Year: 2011).*
List of Retained Names. Nomenclature of Organic Chemistry, Sections A, B, C, D, E, F, and H, Pergamon Press, Oxford, 1979. Copyright 1979 IUPAC. As viewed within https://www.acdlabs.com/iupac/nomenclature/79/r79_958.htm. (Year: 1979).*

(Continued)

*Primary Examiner* — Stephen E Rieth
(74) *Attorney, Agent, or Firm* — Andrew H. Chung

(57) ABSTRACT

A catalyst composition for making polyurethane foam, the catalyst composition including a compound having a general formula $R^1R^2R^3N$, wherein each of $R^1$, $R^2$ and $R^3$ are independently selected from the group consisting of:
a compound according to formula (I):

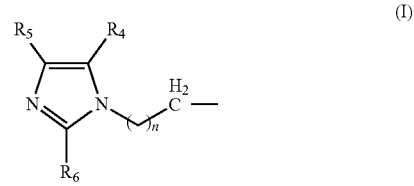

(I)

wherein n=1 to 5; and R4, R5 and R6 are each independently hydrogen, methyl, ethyl and propyl groups; hydrogen, a C1-C6 alkyl group compound, a C1-C6 cycloalkyl group compound, a C1-C6 alkenyl group compound, a C1-C6 alkynyl group compound, a C1-C6 aryl group compound, and a C1-C6 aralkyl group compound, each group being substituted or unsubstituted; wherein at least one of $R^1$, $R^2$ and $R^3$ is a compound according to formula (I). A polyurethane composition and method for forming a polyurethane foam are also disclosed.

18 Claims, 1 Drawing Sheet

(56) References Cited

U.S. PATENT DOCUMENTS

2007/0197760 A1* 8/2007 Kometani ............ C08G 18/161
528/48
2013/0137787 A1* 5/2013 Burdeniuc .......... B01J 31/0237
521/115

FOREIGN PATENT DOCUMENTS

| EP | 0401787 A2 | 12/1990 |
| EP | 1312630 A1 | 5/2003 |
| EP | 1630185 A1 | 3/2006 |
| JP | H03122108 A | 5/1991 |
| JP | 2005171047 A | 6/2005 |
| JP | 2011207854 A * | 10/2011 |
| WO | 2016040783 A1 | 3/2016 |

OTHER PUBLICATIONS 1-methylimidazole technical data sheet. BASF. Oct. 2007. (Year: 2007).*
PCT International Search Report dated Oct. 16, 2017 corresponding to PCT Application No. PCT/US2017/041567 filed Jul. 11, 2017. (5 pages).

* cited by examiner

Lamination foam specimen for adhesion testing showing rigid foam made according to example 17 sandwich between paper/aluminum foil facers.
Specimen Before Testing
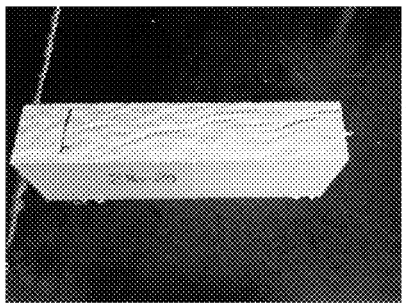
Specimen After Testing Where Adhesion to Foil is Better Than Adhesion to Foam
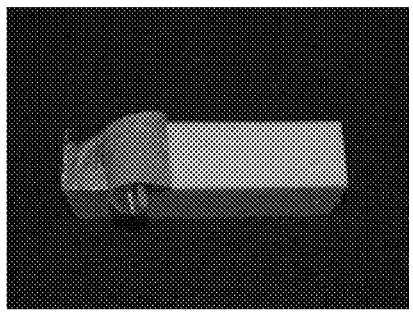
Specimen After Testing Where Adhesion to Foam is Better Than Adhesion to Foil
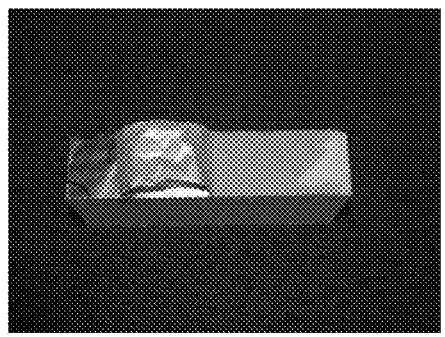
Exhibit A

AMINE COMPOSITION USEFUL FOR MAKING POLYURETHANE FOAM

CROSS-REFERENCE TO RELATED APPLICATIONS

This application claims priority from U.S. Ser. No. 62/360,543 filed Jul. 11, 2016 having the same title, which is incorporated herein by reference in its entirety.

FIELD OF THE INVENTION

The field of invention is the composition and application of catalysts useful for the production of polyurethane foams including rigid polyurethane foam utilized in insulation as well as flexible polyurethane foam utilized in various applications such as bedding, furniture, home interiors and general automotive applications.

BACKGROUND OF THE INVENTION

Polyurethane foam compositions are typically prepared by reacting an isocyanate and a premix which consists of isocyanate-reactive components such as a polyol. The premix optionally also contains other components such as water, flame retardants, blowing agents, foam-stabilizing surfactants, and catalysts to promote the reactions of isocyanate with polyol to make urethane, with water to make $CO_2$ and urea, and with excess isocyanate to make isocyanurate (trimer). The presence of isocyanurate in PIR/PUR foam products provides excellent thermal stability and flame resistance. Isocyanurates are stable to temperatures of about 160° C. and are resistant to most organic solvents, acids, alkali, ultraviolet light, and humidity.

The blowing agent in the premix is usually a liquid or gas with a boiling point sufficiently low to be vaporized by the heat released during the polymerization reaction. Examples of blowing agents useful in the production of insulating polyurethane foam include but are not limited to hydrofluorocarbons, hydrofluoroolefins, hydrofluorochloroolefins, hydrochlorofluorocarbons, formates, ketones such as acetone and hydrocabons. Unlike simple hydrocarbons, such as pentane, halogen containing molecules such as chrolofluorocarbons (CFCs), hydrochlorofluorocarbons (HCFCs) and hydrofluorocarbons (HFCs) are far less flammable and safer to use in foam production. However, they either harm the ozone layer or contribute to global warming in other ways. In contrast, with a much lower global warming potential (GWP), HFOs are very efficient and environmentally friendly blowing agents. However, decomposition of HFO can happen in an amine catalyst containing formulation. Considering the wide use of amine catalysts in polyurethane foam production, this has limited the use of HFOs.

Thus, the proper selection and combination of the components in the premix and the isocyanate can be useful for the production of polyurethane foam that is spray applied, poured in place, and used in applications such as refrigerators, freezers, hot water heaters, insulation panels, garage doors, entry doors, and other various applications where insulation is desired. For some of these applications, the premix is stored for one day up to one year before being reacted with isocyanate to generate polyurethane foam. This is common in spray foam applications, where drums of premix and isocyanate are shipped to field locations for on-site application. Thus, it is desirable for the premix of an insulating foam formulation to be both chemically and physically stable. However, in some cases, the catalysts that are useful to promote the polyurethane reaction can also participate or induce undesired hydrolysis reactions with the blowing agents present in the premix resulting in reduced storage stability. Common amine catalysts useful for the production of polyurethane foam include tertiary amines which are known to accelerate the urethane reaction promoting the formation of polyurethane polymers. However, in some cases, tertiary amines can catalyze the hydrolysis of esters causing the formation of carboxylic acids which in turn can neutralize the tertiary amine catalysts in the systems causing a slowdown in the reactivity of the mixture towards isocyanate. This reactivity slowdown can also result in various quality issues such as sagging during spray foam applications and it can also produce polyurethane foam with poor physical properties.

These undesired reactions are typically observed in spray foam systems containing polyester polyol as well as spray foam systems containing halogenated components that can act as flame retardants or blowing agent.

Rigid polyurethane spray foam is widely used in construction and building industries as rigid foam insulation, which reduces energy consumption. Rigid polyurethane spray foam is typically applied directly onto substrates surface. Examples of substrates include oriented strand board (OSB), gypsum, concrete, wood, steel and various other metal surfaces. Rigid polyurethane spray foam requires to be applied under a variety of conditions and depending on weather wide fluctuations of temperature and humidity can affect the adhesion of the polyurethane product to the substrate. Rigid polyurethane spray foam typically cracks from the substrate when spraying is carried out at relatively low temperature (less than 10° C.). Cracking between the substrate and the rigid polyurethane spray foam allows air and moisture to enter the interface of foam and substrate reducing the thermal insulation efficiency of the foam. In some extreme cases, cracking could even prevent the foam layer to adhere to the substrate effectively making the foam layer to further pull away from the substrate causing complete failure of spray foam application. Current available solutions to this problem include using special catalysts such as 1-methylimidazole, 1,2-dimethylimidazole and N,N-dimethylbenzylamine. However, these catalysts have certain limitations including undesired emanations and odor from foam particularly when spraying at lower temperatures where the required use level is higher.

Thus there is a need in the polyurethane industry for catalysts able to provide premixes that are stable towards polyester polyols, flame retardants, halogen containing blowing agents and in particular premixes that are stable towards HFO. There is also a need in the industry to provide catalysts able to improve adhesion of polyurethane towards various substrates such as wood, concrete, gypsum, composite materials such as oriented strand boards, steel and other metals to give finished products characterized by having low emissions or no emissions and low amine odor or no amine odor.

U.S. Pat. No. 5,100,927 discloses a process for producing rigid polyurethane foam by reducing the amount of CFC in the presence of water as blowing agent. The patent does not disclose the use of low GWP blowing agents such as HFOs, haloolefins and hydrohaloolefins together with the catalysts of the present invention.

U.S. Pat. No. 8,513,318 discloses a process for producing a rigid polyurethane foam using HFC together with water as a blowing agent. The disclosure does not teach the use of HFOs, haloolefins and hydrohaloolefins and other low GWP blowing agents together with the catalysts of the invention.

U.S. Pat. No. 5,104,907 discloses a process for producing flexible high resilience polyurethane foam by using imidazole compounds as catalyst.

U.S. Pat. No. 5,306,738 discloses a process for producing flexible polyurethane foam by using water, or water and halogenated hydrocarbon mixture as blowing agent, and imidazole compounds as catalyst.

U.S. Pat. No. 7,572,837 discloses a process of producing a flexible polyurethane foam without using tin based catalyst.

The disclosure of the previously identified patents are hereby incorporated by reference.

BRIEF SUMMARY OF THE INVENTION

The instant invention can solve problems associated with conventional foam precursors by permitting the use of the inventive catalysts thereby improving the storage stability of an isocyanate reactive mixture comprising polyester polyols, and various blowing agents including pentane, halogen containing molecules such as chlorofluorocarbons (CFCs), hydrochlorofluorocarbons (HCFCs) and hydrofluorocarbons (HFCs), Hydrofluoroolefins (HFOs), hydrochloroolefins (HCOs), hydrochlorofluoroolefins (HCFOs), haloolefins and hydrohaloolefins in general. The invention is particularly useful when using HFOs and haloolefin blowing agents in general. The catalyst can also be use in flexible foam applications to produce polyurethane products with low emissions or no amine emissions and with low amine odor or no amine odor.

The present invention provides a novel polyurethane catalyst/additive composition having the following benefits: a) promoting adhesion of spray polyurethane foam onto substrates under cold weather conditions; b) minimize polyester polyol, flame retardant and blowing agent degradation in the premix mixture; c) minimize HFOs, haloolefins and hydrohaloolefins degradation of the premix allowing the use of low GWP blowing agents; d) minimize or eliminate amine odor; and e) minimize or eliminate emissions associated with catalyst.

The catalyst composition is defined as at least one compound with a general formula $R^1R^2R^3N$ wherein the catalyst composition is a or b, or c or d wherein a, b, c and d are defined as:

a. a compound with a general formula $R^1R^2R^3N$ wherein each of $R^1$, $R^2$ and $R^3$ is a compound according to formula (I):

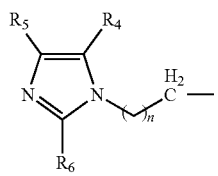

wherein n=1 to 5; and $R^4$, $R^5$ and $R^6$ are each independently hydrogen, methyl, ethyl and propyl groups;

b. a compound with a general formula $R^1R^2R^3N$ wherein $R^1$ and $R^2$ is a compound according to formula (I):

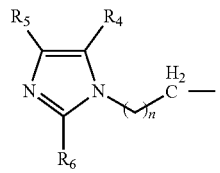

wherein n=1 to 5 and $R^4$, $R^5$ and $R^6$ are each independently hydrogen, methyl, ethyl and propyl groups; and $R^3$ is hydrogen or $C_1$-$C_6$ alkyl group, cycloalkyl, alkenyl, alkynyl, aryl, or aralkyl, any of which are substituted or unsubstituted;

c. a compound with a general formula $R^1R^2R^3N$ wherein $R^1$ is a compound according to formula (I):

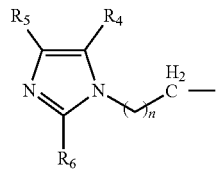

wherein n=1 to 5; $R^4$, $R^5$ and $R^6$ are each independently hydrogen, methyl, ethyl and propyl groups; and $R^2$ and $R^3$ are each independently hydrogen or $C_1$-$C_6$ alkyl group, cycloalkyl, alkenyl, alkynyl, aryl, or aralkyl, any of which are substituted or unsubstituted in the presence of a or b or d or a mixture of a, b and d; and d. a compound with a general formula $R^1R^2R^3N$ wherein $R^1$ is a compound according to formula (I):

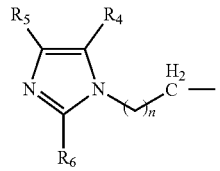

wherein n=1 to 5; $R^4$, $R^5$ and $R^6$ are each independently hydrogen, methyl, ethyl and propyl groups; and $R^2$ and $R^3$ are each independently hydrogen or $C_1$-$C_6$ alkyl group, cycloalkyl, alkenyl, alkynyl, aryl, or aralkyl, any of which are substituted or unsubstituted.

The various aspects and embodiments herein can be used alone or in combinations with each other.

BRIEF DESCRIPTION OF THE DRAWINGS

"FIG. 1 shows a rigid polyurethane sample prepared according to example 1417 for adhesion testing."

DEFINITIONS

The following definitions are provided in order to aid those skilled in the art in understanding the detailed description of the present invention.

PUR—Polyurethane.

Isocyanate Index—The actual amount of polyisocyanate used, divided by the theoretically required stoichiometric amount of polyisocyanate required to react with all the active hydrogen in the reaction mixture, multiplied by 100. Also known as (Eq NCO/Eq of active hydrogen)×100.

pphp—parts by weight per hundred weight parts polyol.
DMI—1,2-dimethylimidazole
BDMA—Benzyl dimethylamine
DABCO® 2039 catalyst from Evonik is a 50% solution of 1,2-dimethylimidazole in dipropylene glycol.
Polycat®-77 catalyst from Evonik is a polyurethane catalyst, known chemically as pentamethyldipropylenetriamine.

DETAILED DESCRIPTION OF THE INVENTION

The present invention is directed to a novel catalyst composition comprising a catalyst composition defined as at least one compound with a general formula $R^1R^2R^3N$ wherein the catalyst composition is a or b, or c or d wherein a, b, c and d are defined as:

a. a compound with a general formula $R^1R^2R^3N$ wherein each of $R^1$, $R^2$ and $R^3$ is a compound according to formula (I):

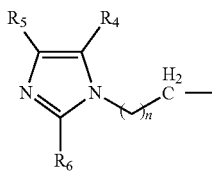

wherein n=1 to 5; and $R^4$, $R^5$ and $R^6$ are each independently hydrogen, methyl, ethyl and propyl groups;

b. a compound with a general formula $R^1R^2R^3N$ wherein $R^1$ and $R^2$ is a compound according to formula (I):

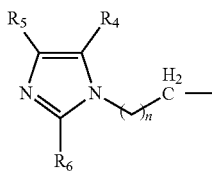

wherein n=1 to 5 and $R^4$, $R^5$ and $R^6$ are each independently hydrogen, methyl, ethyl and propyl groups; and $R^3$ is hydrogen or $C_1$-$C_6$ alkyl group, cycloalkyl, alkenyl, alkynyl, aryl, or aralkyl, any of which are substituted or unsubstituted;

c. a compound with a general formula $R^1R^2R^3N$ wherein $R^1$ is a compound according to formula (I):

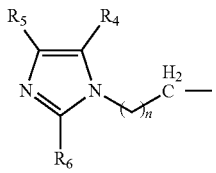

wherein n=1 to 5; $R^4$, $R^5$ and $R^6$ are each independently hydrogen, methyl, ethyl and propyl groups; and $R^2$ and $R^3$ are each independently hydrogen or $C_1$-$C_6$ alkyl group, cycloalkyl, alkenyl, alkynyl, aryl, or aralkyl, any of which are substituted or unsubstituted in the presence of a or b or d or a mixture of a, b and d; and d. a compound with a general formula $R^1R^2R^3N$ wherein $R^1$ is a compound according to formula (I):

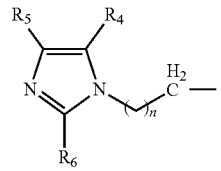

wherein n=1 to 5; $R^4$, $R^5$ and $R^6$ are each independently hydrogen, methyl, ethyl and propyl groups; and $R^2$ and $R^3$ are each independently hydrogen or $C_1$-$C_6$ alkyl group, cycloalkyl, alkenyl, alkynyl, aryl, or aralkyl, any of which are substituted or unsubstituted.

The composition provides a novel polyurethane catalyst composition having the following benefits: a) promoting adhesion of spray polyurethane foam onto substrates under cold weather conditions; b) minimize polyester polyol, flame retardant and blowing agent degradation in the premix mixture; c) minimize HFOs, haloolefins and hydrohaloolefins degradation of the premix allowing the use of low GWP blowing agents; d) minimize or eliminate amine odor; and e) minimize or eliminate emissions associated with catalyst. Adhesion is measured in accordance with the procedure described in Example 14. The results were normalized based on the maximum load to break a sample made from the positive control 1,2-dimethylimidazole (DMI). The acceptable relative adhesion values range from about 0.7 to about 1.5, about 0.8 to about 1.2 and in some cases about 0.9 to about 1.1. Degradation is determined by measuring the foam rise of an aged pre-mix in comparison to an unaged pre-mix (e.g., a degraded system will have an increased foam rise time at 80% max foam height in comparison to an unaged system), and the detail is described in Example 16. The foam rise time at 80% max foam height of an undegraded and aged pre-mix will be about 0 to about 5, about 0 to about 3 and in some cases about 0 to about 1 seconds different compared with an unaged premix. Amine emissions of foams made with selected catalysts were measured in accordance with microchamber method (WK 40293).

Further, the present invention also is directed to novel compositions comprising the contact product of at least one active hydrogen-containing compound, at least one blowing agent, and a catalyst composition as defined above in a or b or c or d.

Additionally, the present invention is directed to novel compositions comprising the contact product of at least one polyisocyanate, at least one blowing agent, and a catalyst composition as defined above in a or b or c or d in combination with a tertiary amine having or not an isocyanate reactive group. These novel compositions can be used together with additional components to produce polyurethane foams.

Also, the present invention provides a method for preparing a polyurethane foam which comprises contacting at least one polyisocyanate with at least one active hydrogen-containing compound in the presence of at least one blowing agent and an effective amount of a catalyst composition as defined in a or b or c or d above in combination with a tertiary amine having or not an isocyanate reactive group.

Additionally, polyurethane foams can be produced with the novel catalyst system and novel compositions of the present invention by several methods known within the art.

A catalyst composition comprising a catalyst as defined in a or b or c or d above in combination with a tertiary amine having or not an isocyanate reactive group can be used to catalyze the reaction between isocyanates and polyols to produce polyurethane foam.

Generally, any amount of catalyst composition as defined in a or b or c or d above can be used in the compositions of the present invention.

Applicants disclose several types of ranges in the present invention. These include, but are not limited to, a range of temperatures; a range of number of atoms; a range of foam density; a range of isocyanate index; and a range of pphp for the blowing agent, water, surfactant, flame retardant, and catalyst composition as defined in a or b or c or d above.

When Applicants disclose or claim a range of any type, Applicants' intent is to disclose or claim individually each possible number that such a range could reasonably encompass, as well as any sub-ranges and combinations of sub-ranges encompassed therein. For example, when Applicants disclose or claim a chemical moiety having a certain number of carbon atoms, Applicants' intent is to disclose or claim individually every possible number that such a range could encompass, consistent with the disclosure herein.

For example, the disclosure that $R^2$ and $R^3$ are each independently hydrogen or $C_1$-$C_6$ alkyl group, cycloalkyl, alkenyl, alkynyl, aryl, or aralkyl, any of which are substituted or unsubstituted mean for example that an alkyl group having up to 6 carbon atoms, or in alternative language a $C_1$ to $C_6$ alkyl group, as used herein, refers to a "$R^2$" or "$R^3$" group that can be selected independently from an alkyl group having 1, 2, 3, 4, 5 or 6 carbon atoms, as well as any range between these two numbers (for example, a $C_1$ to $C_4$ alkyl group), and also including any combination of ranges between these two numbers (for example, a $C_1$ to $C_3$ and $C_4$ to $C_6$ alkyl group).

Similarly, another representative example follows for the parts by weight of the catalyst composition as defined in a or b or c or d per hundred weight parts of the at least one active hydrogen-containing compound in a composition or a foam formulation. If the at least one active hydrogen-containing compound is an at least one polyol, the parts by weight per hundred weight parts polyol is abbreviated as pphp. Hence, by the disclosure that the catalyst composition as defined in a or b or c or d is present in an amount from about 0.05 to about 10 pphp, for example, Applicants intend to recite that the pphp can be selected from about 0.05, about 0.06, about 0.07, about 0.08, about 0.09, about 0.1, about 0.2, about 0.3, about 0.4, about 0.5, about 0.6, about 0.7, about 0.8, about 0.9, about 1, about 2, about 3, about 4, about 5, about 6, about 7, about 8, about 9, or about 10. Likewise, all other ranges disclosed herein should be interpreted in a manner similar to these two examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

In another aspect of the invention, the catalyst compositions can be used to make rigid foams (foam that is unable to bend or be forced out of shape) having a density of about 0.5 lb/ft$^3$ to about 5 lb/ft$^3$, about 1 lb/ft$^3$ to about 4 lb/ft$^3$ and in some cases about 2 lb/ft$^3$ to about 3 lb/ft$^3$. The catalyst compositions can be used to make close celled spray foam having desirable adhesion to wood (e.g., as illustrated in the instant Examples). Foam adhesion was measured using ASTM 1623 method showing adhesion values comparable (+/−20%) to emissive standard 1,2-dimethylmidazole. In a further aspect, the catalyst compositions can be used to make spray foams having a density of about 0.5 lb/ft$^3$ to about 5 lb/ft$^3$, about 1 lb/ft$^3$ to about 4 lb/ft$^3$ and in some cases about 2 lb/ft$^3$ to about 3 lb/ft$^3$. Density can be measured in accordance with ASTM D3574 Test A.

In one aspect of the invention, the catalyst composition as defined in a or b or c or d comprise at least one member selected from the group consisting of N,N-bis(3-imidazolylpropyl) amine, N,N-bis(3-(2-methylimidazolyl)propyl) amine, N,N-bis(3-(2,3-dimethylimidazolyl)propyl) amine, N,N-bis(3-imidazolylpropyl)-N-methyl-amine, N,N-bis(3-imidazolylpropyl)-N-ethyl-amine, N,N-bis(3-imidazolylpropyl)-N-propyl-amine, N,N-bis(3-imidazolylpropyl)-N-butyl-amine, N,N-bis(3-imidazolylpropyl)-N-pentyl-amine, N,N-bis(3-imidazolylpropyl)-N-hexyl-amine, N,N-bis(3-imidazolylpropyl)-N-heptyl-amine, N,N-bis(3-imidazolylpropyl)-N-octyl-amine, N,N-bis(3-imidazolylpropyl)-N-(2-ethylhexyl)-amine, N,N-bis(3-(2-methylimidazolyl)propyl)-N-methyl-amine, N,N-bis(3-(2-methylimidazolyl)propyl)-N-ethyl-amine, N,N-bis(3-(2-methylimidazolyl)propyl)-N-propyl-amine, N,N-bis(3-(2-methylimidazolyl)propyl)-N-butyl-amine, N,N-bis(3-(2-methylimidazolyl)propyl)-N-pentyl-amine, N,N-bis(3-(2-methylimidazolyl)propyl)-N-hexyl-amine, N,N-bis(3-(2-methylimidazolyl)propyl)-N-heptyl-amine, N,N-bis(3-(2-methylimidazolyl)propyl)-N-octyl-amine, N,N-bis(3-(2-methylimidazolyl)propyl)-N-(2-ethylhexyl)-amine, N,N-bis(3-(3-methylimidazolyl)propyl)-N-methyl-amine, N,N-bis(3-(3-methylimidazolyl)propyl)-N-ethyl-amine, N,N-bis(3-(3-methylimidazolyl)propyl)-N-propyl-amine, N,N-bis(3-(3-methylimidazolyl)propyl)-N-butyl-amine, N,N-bis(3-(3-methylimidazolyl)propyl)-N-pentyl-amine, N,N-bis(3-(3-methylimidazolyl)propyl)-N-hexyl-amine, N,N-bis(3-(3-methylimidazolyl)propyl)-N-heptyl-amine, N,N-bis(3-(3-methylimidazolyl)propyl)-N-octyl-amine, N,N-bis(3-(3-methylimidazolyl)propyl)-N-(2-ethylhexyl)-amine, N,N-bis(3-(2,3-dimethylimidazolyl)propyl)-N-methyl-amine, N,N-bis(3-(2,3-dimethylimidazolyl)propyl)-N-ethyl-amine, N,N-bis(3-(2,3-dimethylimidazolyl)propyl)-N-propyl-amine, N,N-bis(3-(2,3-dimethylimidazolyl)propyl)-N-butyl-amine, N,N-bis(3-(2,3-dimethylimidazolyl)propyl)-N-pentyl-amine, N,N-bis(3-(2,3-dimethylimidazolyl)propyl)-N-hexyl-amine, N,N-bis(3-(2,3-dimethylimidazolyl)propyl)-N-heptyl-amine, N,N-bis(3-(2,3-dimethylimidazolyl)propyl)-N-octyl-amine, N,N-bis(3-(2,3-dimethylimidazolyl)propyl)-N-(2-ethylhexyl)-amine, N-(3-imidazolylpropyl)-N-benzyl-N-methyl-amine, N,N-bis(3-(2-methylimidazolyl)propyl)-N-benzyl-amine, N,N-bis(3-(3-methylimidazolyl)propyl)-N-benzyl-amine, N,N-bis(3-(2,3-dimethylimidazolyl)propyl)-N-benzyl-amine, N,N,N-tris(3-imidazolylpropyl)-amine, N,N,N-tris(3-(2-methylimidazolyl)propyl)-amine, N,N,N-tris(3-(2,3-dimethylimidazolyl)propyl)-amine, N,N,N-tris(3-(2,3,4-trimethylimidazolyl)propyl)-amine, bis(3-(2-ethylimidazolyl)propyl)-N-methyl-amine, bis(3-(3- ethylimidazolyl)propyl)-N-methyl-amine, bis(3-(2,3-diethylimidazolyl)propyl)-N-methyl-amine, N,N,N-tris(3-(2-ethylimidazolyl)propyl)-amine, N,N,N-tris(3-(3-ethylimidazolyl)propyl)-amine, N,N,N-tris(3-(2,3-diethylimidazolyl)propyl)-amine, bis(3-(2-propylimidazolyl)propyl)-N-methyl-amine, bis(3-(3-propylimidazolyl)propyl)-N-methyl-amine, bis(3-(2,3-dipropylimidazolyl)propyl)-N-methyl-amine, bis(3-(2-butylmidazolyl)propyl)-N-methyl-amine, bis(3-(3-butylmidazolyl)propyl)-N-methyl-amine, bis(3-(2,3-dibutylmidazoyl)propyl)-N-methyl-amine, N,N,N-tris(3-(3-butylimidazolyl)propyl)-amine, N,N,N-tris(3-(2-butylimidazolyl)propyl)-amine, N,N,N-tris(3-(2,3-dibuthylimidazolyl)propyl)-amine and the like. Such compounds can be employed individually or in any combination thereof.

The catalyst composition as defined in a or b or c or d is used in combination with at least one tertiary amine having at least one isocyanate reactive group comprising a primary hydroxyl group, a secondary hydroxyl group, a primary amine group, a secondary amine group, a urea group or an amide group. Examples of a tertiary amine catalyst having an isocyanate group include, but are not limited to N, N-bis(3-dimethylaminopropyl)-N-isopropanolamine, N, N-dimethylaminoethyl-N'-methyl ethanolamine, N, N, N'-trimethylaminopropylethanolamine, N, N-dimethylethanolamine, N, N-diethylethanolamine, N, N-dimethyl-N', N'-2-hydroxy(propyl)-1,3-propylenediamine, dimethylaminopropylamine, (N, N-dimethylaminoethoxy) ethanol, methyl-hydroxy-ethyl-piperazine, bis(N, N-dimethyl-3-aminopropyl) amine, N, N-dimethylaminopropyl urea, diethylaminopropyl urea, N, N'-bis(3-dimethylaminopropyl)urea, N, N'-bis(3-diethylaminopropyl)urea, bis(dimethylamino)-2-propanol, 6-dimethylamino-1-hexanol, N-(3-aminopropyl) imidazole), N-(2-hydroxypropyl) imidazole, and N-(2-hydroxyethyl) imidazole, 2-[N-(dimethylaminoethoxyethyl)-N-methylamino] ethanol, N, N-dimethylaminoethyl-N'-methyl-N'-ethanol, dimethylaminoethoxyethanol, N, N, N'-trimethyl-N'-3-aminopropyl-bis(aminoethyl) ether, or a combination thereof. The weight ratio of suitable tertiary amines to the inventive catalyst can range from about 0 to about 100, about 0.1 to about 50 and in some cases about 1 to about 10.

The inventive catalyst can also be acid blocked with an acid including carboxylic acids (alkyl, substituted alkyl, alkylene, aromatic, substituted aromatic), sulfonic acids or any other organic or inorganic acid. Examples of carboxylic acids include mono-acids, di-acids or poly-acids with or without isocyanate reactive groups. Examples of carboxylic acids include formic acid, acetic acid, propionic acid, butanoic acid, pentanoic acid, neopentanoic acid, hexanoic acid, 2-ethylhexyl carboxylic acid, neohexanoic acid, octanoic acid, neooctanoic acid, heptanoic acid, neoheptanoic acid, nonanoic acid, neononanoic acid, decanoic acid, neodecanoic acid, undecanoic acid, neoundecanoic acid, dodecanoic acid, neododecanoic acid, myristic acid, pentadecanoic acid, hexadecanoic acid, heptadecanoic acid, octadecanoic acid, benzoic acid, oxalic acid, malonic acid, succinic acid, glutaric acid, adipic acid, pimelic acid, suberic acid, azelaic acid, sebacic acid, glycolic acid, lactic acid, tartaric acid, citric acid, malic acid, salicylic acid and the like. An acid blocked catalyst can be obtained by known methods using conventional equipment.

The catalyst composition as defined in a or b or c or d can be produced, for example, by 1) reacting a mixture of Imidazole and water with acrylonitrile in a stainless steel reactor equipped with mechanical stirrer, heating mantle, cooling coil and a high pressure syringe pump connected with stainless steel feeding lines. Then the steel reactor is sealed and purged with nitrogen for three times and the temperature of the reactor is increased to 50° C. and stirred for 30 min to help dissolve all the imidazole. Acrylonitrile is then charged into the reactor from a high pressure syringe pump while maintaining the reactor temperature at 50° C. Once the addition is completed, reaction temperature is held at 50° C. for 10 hours before the heating is shut down. The reactor is then vented after cooling to room temperature. All volatiles are removed on rotary evaporator under vacuum. CE-IM (Cyanoethylimidazole) is collected in 98.5% yield and 100% purity based on GC analysis; 2) CE-IM, water and 5% Pd/Al$_2$O$_3$ are charged into a stainless steel reactor equipped with mechanical stirrer, heating mantle, cooling coil and a high pressure syringe pump connected with stainless steel feeding lines. Then the steel reactor is sealed and purged with nitrogen gas for three times followed by hydrogen gas for three times while stirring. Formaldehyde 37 wt. % aqueous solution is charged into the high pressure syringe pump. Then the reactor is heated to 120° C. and the pressure of hydrogen gas pressure is set at 800 psi. Formaldehyde solution is fed from the pump into the reactor for about 2-3 hours until the hydrogen uptake finished and kept for an additional hour. The reactor is vented after cooling to room temperature. All volatiles are removed on rotary evaporator under reduced pressure, and the final product is collected as a mixture of material containing, in one aspect of the invention, imidazole (0.6%), N,N-dimethylaminopropylimidazole (3.2%), N,N-bis-(3-imidazolylpropyl)-N-methylamine (68%) and N,N,N,-tris-(3-imidazolylpropyl)-amine (26%) based on GC analysis. Alternatively, other metal catalysts can also be used such as Pd/C, Raney Nickel and Raney Cobalt. Examples of suitable imidazoles that can be used comprise at least one member selected from the group consisting of imidazole, 5-methylimidazole, 5-ethylimidazole, 5-propylimidazole, 4-methylimidazole, 4,5-dimethylimidazole, 4-methyl-5-ethylimidazole, 4-methyl-5-propylimidazole, 4-ethylimidazole, 4-ethyl-5-methylimidazole, 4,5-diethylimidazole, 4-ethyl-5-propylimidazole, 4-propylimidazole, 4-propyl-5-methylimidazole, 4-propyl-5-ethylimidazole, 4,5-dipropylimidazole, 2-methylimidazole, 2,5-dimethylimidazole, 2-methyl-5-ethylimidazole, 2-methyl-5-propylimidazole, 2,4-dimethylimidazole, 2,4,5-trimethylimidazole, 2,4-dimethyl-5-ethylimidazole, 2,4-dimethyl-5-propylimidazole, 2-methyl-4-ethylimidazole, 2,5-dimethyl-4-ethylimidazole, 2-methyl-4,5-diethylimidazole, 2-methyl-4-ethyl-5-propylimidazole, 2-methyl-4-propylimidazole, 2,5-dimethyl-4-propylimidazole, 2-methyl-4-propyl-5-ethylimidazole, 2-methyl-4,5-dipropylimidazole, 2-ethylimidazole, 2-ethyl-5-methylimidazole, 2,5-diethylimidazole, 2-ethyl-5-propylimidazole, 2-ethyl-4-methylimidazole, 2-ethyl-4,5-dimethylimidazole, 2,5-diethyl-4-methylimidazole, 2-ethyl-4-methyl-5-propylimidazole, 2,4-diethylimidazole, 2,4-diethyl-5-methylimidazole, 2,4,5-triethylimidazole, 2,4-diethyl-5-propylimidazole, 2-ethyl-4-propylimidazole, 2-ethyl-4-propyl-5-methylimidazole, 2,5-diethyl-4-propylimidazole, 2-ethyl-4,5-dipropylimidazole, 2-propylimidazole, 2-propyl-5-methylimidazole, 2-propyl-5-ethylimidazole, 2,5-dipropylimidazole, 2-propyl-4-methylimidazole, 2-propyl-4,5-dimethylimidazole, 2-propyl-4-methyl-5-ethylimidazole, 2,5-dipropyl-4-methylimidazole, 2-propyl-4-ethylimidazole, 2-propyl-4-ethyl-5-methylimidazole, 2-propyl-4,5-diethylimidazole, 2,5-dipropyl-4-ethylimidazole, 2,4-dipropylimidazole, 2,4-dipropyl-5-methylimidazole, 2,4-dipropyl-5-ethylimidazole, 2,4,5-tripropylimidazole and the like. Such compounds can be employed individually or in any combination thereof. The molar ratio of total imidazoles to acrylonitrile can range from about 0.5 to about 1.2, about 0.8 to about 1.1 and in some cases about 0.95 to about 1.02.

Although not a requirement of the present invention, the catalyst system or novel compositions of the present invention can further comprise other catalytic materials such as carboxylate salts in any amount. These can include, but are not limited to, alkali metal α,β-unsaturated carboxylate salts, alkaline earth metal α,β-unsaturated carboxylate salts, quaternary ammonium α,β-unsaturated carboxylate salts, alkali metal carboxylate salts, alkaline earth metal carboxylate salts, quaternary ammonium carboxylate salts, or any combination thereof. Illustrative examples of α,β-unsaturated carboxylate salts include, but are not limited to, potassium acrylate, tetramethylammonium acrylate, tetraethylammonium acrylate, tetrapropylammonium acrylate, tetrabutylammonium acrylate, potassium methacrylate, tetramethylammonium methacrylate, tetraethylammonium methacrylate, tetrapropylammonium methacrylate, tetrabutylammonium methacrylate, mono-potassium fumarate, bis-potassium fumarate, mono-tetramethylammonium fumarate, bis-tetramethylammonium fumarate, potassium tetramethylammonium fumarate, mono-tetraethylammonium fumarate, bis-tetraethylammonium fumarate, potassium tetraethylammonium fumarate, mono-tetrapropylammonium fumarate, bis-tetrapropylammonium fumarate, potassium tetrapropylammonium fumarate, mono-tetrabutylammonium fumarate, bis-tetrabutylammonium fumarate, potassium tetrabutylammonium fumarate, mono-potassium maleate, bis-potassium maleate, mono-tetramethylammonium maleate, bis-tetramethylammonium maleate, potassium tetramethylammonium maleate, mono-tetraethylammonium maleate, bis-tetraethylammonium maleate, potassium tetraethylammonium maleate, mono-tetrapropylammonium maleate, bis-tetrapropylammonium maleate, potassium tetrapropylammonium maleate, mono-tetrabutylammonium maleate, bis-tetrabutylammonium maleate, potassium tetrabutylammonium maleate, trimethyl(2-hydroxyethyl)ammonium acrylate, triethyl(2-hydroxyethyl)ammonium acrylate, tripropyl(2-hydroxyethyl)ammonium acrylate, tributyl(2-hydroxyethyl)ammonium acrylate, dimethylbenzyl(2-hydroxypropyl)ammonium acrylate, dimethylbenzyl(2-hydroxyethyl)ammonium acrylate, trimethyl(2-hydroxyethyl)ammonium methacrylate, triethyl(2-hydroxyethyl)ammonium methacrylate, tripropyl(2-hydroxyethyl)ammonium methacrylate, tributyl(2-hydroxyethyl)ammonium methacrylate, dimethylbenzyl(2-hydroxypropyl)ammonium methacrylate, dimethylbenzyl(2-hydroxyethyl)ammonium methacrylate, bis-(trimethyl(2-hydroxyethyl)ammonium) maleate, bis-(triethyl(2-hydroxyethyl)ammonium) maleate, bis-(tripropyl(2-hydroxyethyl)ammonium) maleate, bis-(tributyl(2-hydroxyethyl)ammonium) maleate, bis-(dimethylbenzyl(2-hydroxypropyl)ammonium) maleate, bis-(dimethylbenzyl(2-hydroxyethyl)ammonium) maleate, bis-(trimethyl(2-hydroxyethyl)ammonium) fumarate, bis-(triethyl(2-hydroxyethyl)ammonium) fumarate, bis-(tripropyl(2-hydroxyethyl)ammonium) fumarate, bis-(tributyl(2-hydroxyethyl)ammonium) fumarate, bis-(dimethylbenzyl(2-hydroxypropyl)ammonium) fumarate, bis-(dimethylbenzyl(2-hydroxyethyl)ammonium) fumarate, and the like, or any combination thereof.

Illustrative examples of alkali metal, alkaline earth metal, and quaternary ammonium carboxylate salts include, but are not limited to, potassium formate, potassium acetate, potassium propionate, potassium butanoate, potassium pentanoate, potassium hexanoate, potassium heptanoate, potassium octoate, potassium 2-ethylhexanoate, potassium decanoate, potassium butyrate, potassium isobutyrate, potassium nonante, potassium stearate, sodium octoate, lithium stearate, sodium caprioate, lithium octoate, 2-hydroxypropyltrimethylammonium octoate solution, and the like, or any combination thereof.

The amount of the other catalytic materials and salts can range from about 0 pphp to about 20 pphp, about 0.1 pphp to about 15 pphp and in some cases about 0.5 pphp to about 10 pphp.

It is also within the scope of the catalyst composition of this invention to include mixtures or combinations of more that one catalyst composition as defined in a or b or c or d. Additionally, the catalyst system or the novel compositions of the present invention can also further comprise at least one urethane catalyst having no isocyanate reactive groups.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions or foam formulations described herein. Combining additional catalyst components can be done by any method known to one of skill in the art. For example, in one aspect of the present invention, catalyst compositions can be prepared by combining or contacting the catalyst composition as defined in a or b or c or d with at least one tertiary amine having or not at least one isocyanate reactive group and optionally with an alkali metal carboxylate salt. This typically occurs in solution form.

While compositions and methods are described in terms of "comprising" various components or steps, the compositions and methods can also "consist essentially of" or "consist of" the various components or steps.

Preparation of Polyurethane Foams
Flexible Foam

Foams of any of the various types known in the art may be made using the methods of this invention, using typical polyurethane formulations to which have been added the appropriate amount of the inventive catalyst. For example, flexible polyurethane foams with the excellent characteristics described herein will typically comprise the components shown below in Table A, in the amounts indicated. The components shown in Table A are shown in detail below in the examples.

TABLE A

| Polyurethane Components | |
|---|---|
| Component | Parts by Weight |
| Base Polyol | 20-100 |
| Polymer polyol | 0-80 |
| Silicone surfactant | 0.5-10 |
| Blowing agent | 2-4.5 |
| Crosslinker | 0.5-2 |
| Catalyst | 0.25-10 |
| Carboxylic acid (optional) | 0.05-3.0 |
| Polyisocyanate | To provide NCO index = 60-115 |

The amount of polyisocyanate used in polyurethane formulations according to the invention is not limited, but it will typically be within those ranges known to those of skill in the art. An exemplary range is given in Table A, indicated by reference to "NCO Index" (isocyanate index). As is known in the art, the NCO index is defined as the number of equivalents of isocyanate, divided by the total number of equivalents of active hydrogen, multiplied by 100. The NCO index is represented by the following formula.

NCO index=[NCO/(OH+NH)]*100

Flexible foams typically use copolymer polyols as part of the overall polyol content in the foam composition, along with base polyols of about 4000-5000 weight average molecular weight, a functionality number of 1 to 6 and more typically 2 to 4 and hydroxyl number of about 28-35. Base polyols and copolymer polyols will be described in detail later herein.

Rigid Foam

Foams of any of the various types known in the art may be made using the methods of this invention, using typical polyurethane formulations to which have been added the appropriate amount of sulfite salt catalyst. For example, rigid polyurethane foams with the excellent characteristics described herein will typically comprise the components shown below in Table B, in the amounts indicated. The components shown in Table B will be discussed in detail later below.

TABLE B

Polyurethane Components

| Component | Parts by Weight |
| --- | --- |
| Polyether Polyol | 0-100 |
| Polyester Polyol | 0-100 |
| Mannich Polyol | 0-100 |
| Silicone surfactant | 0.5-10 |
| Blowing agent | 2-4.5 |
| Crosslinker | 0.5-2 |
| Catalyst | 0.25-10 |
| Carboxylic acid (optional) | 0.05-3.0 |
| Polyisocyanate | To provide NCO index = 80-500 |

The amount of polyisocyanate used in polyurethane formulations according to the invention is not limited, but it will typically be within those ranges known to those of skill in the art. An exemplary range is given in Table B, indicated by reference to "NCO Index" (isocyanate index) as defined as above.

Rigid foams typically use aromatic polyester polyols as part of the overall polyol content in the foam composition, along with base polyols (polyether polyols) of about 200-5000 weight average molecular weight, a functionality number of 1 to 6 and more typically 2 to 5 and hydroxyl number of about 50-800. Base polyester polyols and polyether polyols will be described in detail later herein.

Flexible HR Foam

Foams of any of the various types known in the art may be made using the methods of this invention, using typical polyurethane formulations to which have been added the appropriate amount of sulfite salt catalyst. For example, flexible HR polyurethane foams with the excellent characteristics described herein will typically comprise the components shown below in Table C, in the amounts indicated. The components shown in Table C will be discussed in detail later below.

TABLE C

Polyurethane Components

| Component | Parts by Weight |
| --- | --- |
| Base Polyester Polyol | 20-100 |
| Polyether Polyol | 0-80 |

TABLE C-continued

Polyurethane Components

| Component | Parts by Weight |
| --- | --- |
| Silicone surfactant | 0.5-10 |
| Blowing agent | 2-4.5 |
| Crosslinker | 0.5-2 |
| Catalyst | 0.25-10 |
| Carboxylic acid (optional) | 0.05-3.0 |
| Polyisocyanate | To provide NCO index = 60-130 |

The amount of polyisocyanate used in polyurethane formulations according to the invention is not limited, but it will typically be within those ranges known to those of skill in the art. An exemplary range is given in Table C, indicated by reference to "NCO Index" (isocyanate index) as defined above.

Flexible HR foams typically use polyester polyols as part of the overall polyol content in the foam composition, along with polyether polyols of about 4000-5000 weight average molecular weight, a functionality number of 1 to 6 and more typically 2 to 4 and hydroxyl number of about 28-35. Base polyols and copolymer polyols will be described in detail later herein.

Polyisocyanates

Polyisocyanates that are useful in the PIR/PUR foam formation process include, but are not limited to, hexamethylene diisocyanate, isophorone diisocyanate, phenylene diisocyanate, toluene diisocyanate (TDI), diphenyl methane diisocyanate isomers (MDI), hydrated MDI and 1,5-naphthalene diisocyanate. For example, 2,4-TDI, 2,6-TDI, and mixtures thereof, can be readily employed in the present invention. Other suitable mixtures of diisocyanates include, but are not limited to, those known in the art as crude MDI, or PAPI, which contain 4,4'-diphenylmethane diisocyanate along with other isomeric and analogous higher polyisocyanates. In another aspect of this invention, prepolymers of polyisocyanates comprising a partially pre-reacted mixture of polyisocyanates and polyether or polyester polyol are suitable. In still another aspect, the polyisocyanate comprises MDI, or consists essentially of MDI or mixtures of MDI's.

The catalyst system, compositions, and methods of producing PIR/PUR foam of the present invention can be used to manufacture many types of foam. This catalyst system is useful, for example, in the formation of foam products for rigid and flame retardant applications, which usually require a high Isocyanate Index. As defined previously, Isocyanate Index is the actual amount of polyisocyanate used divided by the theoretically required stoichiometric amount of polyisocyanate required to react with all the active hydrogen in the reaction mixture, multiplied by 100. For purposes of the present invention, Isocyanate Index is represented by the equation: Isocyanate Index=(Eq NCO/Eq of active hydrogen)×100, wherein Eq NCO is the number of NCO functional groups in the polyisocyanate, and Eq of active hydrogen is the number of equivalent active hydrogen atoms.

Foam products which are produced with an Isocyanate Index from about 10 to about 800 are within the scope of this invention. In accordance with other aspects of the present invention, the Isocyanate Index ranges from about 20 to about 700, from about 30 to about 650, from about 50 to about 600, or from about 70 to about 500.

Polyols

Active hydrogen-containing compounds for use with the foregoing polyisocyanates in forming the polyisocyanurate/polyurethane foams of this invention can be any of those organic compounds having at least two hydroxyl groups such as, for example, polyols. Polyols that are typically used in PIR/PUR foam formation processes include polyalkylene ether and polyester polyols. The polyalkylene ether polyol includes the poly(alkyleneoxide) polymers such as poly(ethyleneoxide) and poly(propyleneoxide) polymers and copolymers with terminal hydroxyl groups derived from polyhydric compounds, including diols and triols, These include, but are not limited to, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, cyclohexane diol, and sugars such as sucrose and like low molecular weight polyols.

Amine polyether polyols can be used in the present invention. These can be prepared when an amine such as, for example, ethylenediamine, diethylenetriamine, tolylenediamine, diphenylmethanediamine, or triethanolamine is reacted with ethylene oxide or propylene oxide.

In another aspect of the present invention, a single high molecular weight polyether polyol, or a mixture of high molecular weight polyether polyols, such as mixtures of different multifunctional materials and/or different molecular weight or different chemical composition materials can be used.

In yet another aspect of the present invention, polyester polyols can be used, including those produced when a dicarboxylic acid is reacted with an excess of a diol. Non-limiting examples include adipic acid or phathalic acid or phthalic anhydride reacting with ethylene glycol or butanediol. Polyols useful in the present invention can be produced by reacting a lactone with an excess of a diol, for example, caprolactone reacted with propylene glycol. In a further aspect, active hydrogen-containing compounds such as polyester polyols and polyether polyols, and combinations thereof, are useful in the present invention.

The polyol can have an OH number of about 5 to about 600, about 100 to about 600 and in some cases about 50 to about 100 and a functionality of about 2 to about 8, about 3 to about 6 and in some cases about 4 to about 6.

The amount of polyol can range from about 0 pphp to about 100 pphp about 10 pphp to about 90 pphp and in some cases about 20 pphp to about 80 pphp.

Polyurethanes are produced by the reaction of organic isocyanates with the hydroxyl groups of polyol, typically a mixture of polyols. The polyol component of the reaction mixture includes at least a main or "base" polyol. Base polyols suitable for use in the invention include, as non-limiting examples, polyether polyols. Polyether polyols include poly(alkylene oxide) polymers such as poly(ethylene oxide) and poly(propylene oxide) polymers and copolymers with terminal hydroxyl groups derived from polyhydric compounds, including diols and triols. Examples of diols and triols for reaction with the ethylene oxide or propylene oxide include ethylene glycol, propylene glycol, 1,3-butanediol, 1,4-butanediol, 1,6-hexanediol, neopentyl glycol, diethylene glycol, dipropylene glycol, pentaerythritol, glycerol, diglycerol, trimethylol propane, and similar low molecular weight polyols. Other base polyol examples known in the art include polyhydroxy-terminated acetal resins, hydroxyl-terminated amines and hydroxyl-terminated polyamines. Examples of these and other suitable isocyanate-reactive materials may be found in U.S. Pat. No. 4,394,491; hereby incorporated by reference. Suitable polyether polyols also include those containing tertiary amine groups than can catalyze the gelling and the blowing reaction of polyurethanes, for example those described in U.S. Pat. No. 8,367,870; WO 03/016373 A1, WO 01/58976 A1; WO2004/060956 A1; WO03/016372 A1; and WO03/055930 A1; the disclosure of the foregoing WO publications is hereby incorporated by reference. Other useful polyols may include polyalkylene carbonate-based polyols and polyphosphate-based polyols.

In one aspect of the invention, a single high molecular weight polyether polyol may be used as the base polyol. Alternatively, a mixture of high molecular weight polyether polyols, for example, mixtures of di- and tri-functional materials and/or different molecular weight or different chemical composition materials may be used. Such di- and tri-functional materials include, but are not limited to polyethylene glycol, polypropylene glycol, glycerol-based polyether triols, trimethylolpropane-based polyether triols, and other similar compounds or mixtures.

In addition to the base polyols described above, or instead of them, materials commonly referred to as "copolymer polyols" may be included in a polyol component for use according to the invention. Copolymer polyols may be used in polyurethane foams to increase the resistance to deformation, for example to improve the load-bearing properties. Depending upon the load-bearing requirements, copolymer polyols may comprise from 0 to about 80 percent by weight of the total polyol content. Examples of copolymer polyols include, but are not limited to, graft polyols and polyurea modified polyols, both of which are known in the art and are commercially available.

Graft polyols are prepared by copolymerizing vinyl monomers, typically styrene and acrylonitrile, in a starting polyol. The starting polyol is typically a glycerol-initiated triol, and is typically end-capped with ethylene oxide (approximately 80-85% primary hydroxyl groups). Some of the copolymer grafts to some of the starting polyol. The graft polyol also contains homopolymers of styrene and acrylonitrile and unaltered starting polyol. The styrene/acrylonitrile solids content of the graft polyol typically ranges from 5 wt % to 45 wt %, but any kind of graft polyol known in the art may be used.

Polyurea modified polyols are formed by the reaction of a diamine and a diisocyanate in the presence of a starting polyol, with the product containing polyurea dispersion. A variant of polyurea modified polyols, also suitable for use, are polyisocyanate poly addition (PIPA) polyols, which are formed by the in situ reaction of an isocyanate and an alkanolamine in a polyol.

Other suitable polyols that can be used according to the invention include natural oil polyols or polyols obtained from renewable natural resources such as vegetable oils. Polyols useful in the preparation of polyurethane foam from inexpensive and renewable resources are highly desirable to minimize the depletion of fossil fuel and other non-sustainable resources. Natural oils consist of triglycerides of saturated and unsaturated fatty acids. One natural oil polyol is castor oil, a natural triglyceride of ricinoleic acid which is commonly used to make polyurethane foam even though it has certain limitations such as low hydroxyl content. Other natural oils need to be chemically modified to introduce sufficient hydroxyl content to make them useful in the production of polyurethane polymers. There are two chemically reactive sites that can be considered when attempting to modify natural oil or fat into a useful polyol: 1) the unsaturated sites (double bonds); and 2) the ester functionality. Unsaturated sites present in oil or fat can be hydroxylated via epoxidation followed by ring opening or hydroformilation followed by hydrogenation. Alternatively, transesterification can also be utilized to introduce OH groups in natural oil and fat. The chemical process for the preparation of natural polyols using epoxidation route involves a reaction mixture that requires epoxidized natural oil, a ring opening acid catalyst and a ring opener. Epoxidized natural oils include epoxidized plant-based oils (epoxidized vegetable oils) and epoxidized animal fats. The epoxidized natural oils may be fully or partially epoxidized and these oils include soybean oil, corn oil, sunflower oil, olive oil, canola oil, sesame oil, palm oil, rapeseed oil, tung oil, cotton seed oil, safflower oil, peanut oil, linseed oil and combinations thereof. Animal fats include fish, tallow and lard. These natural oils are triglycerides of fatty acids which may be saturated or unsaturated with various chain lengths from C12 to C24. These acids can be: 1) saturated: lauric, myristic, palmitic, steric, arachidic and lignoceric; 2) mono-unsaturated: palmitoleic, oleic, 3) poly-unsaturated: linoleic, linolenic, arachidonic. Partially or fully epoxidized natural oil may be prepared when reacting peroxyacid under suitable reaction conditions. Examples of peroxyacids utilized in the epoxidation of oils have been described in WO 2006/116456 A1; hereby incorporated by reference. Ring opening of the epoxidized oils with alcohols, water and other compounds having one or multiple nucleophilic groups can be used. Depending on the reaction conditions oligomerization of the epoxidized oil can also occur. Ring opening yields natural oil polyol that can be used for the manufacture of polyurethane products. In the hydroformilation/hydrogenation process, the oil is hydroformylated in a reactor filled with a hydrogen/carbon monoxide mixture in the presence of a suitable catalyst (typically cobalt or rhodium) to form an aldehyde which is hydrogenated in the presence of cobalt or nickel catalyst to form a polyol. Alternatively, polyol from natural oil and fats can be produced by trans-esterification with a suitable poly-hydroxyl containing substance using an alkali metal or alkali earth metal base or salt as a trans-esterification catalyst. Any natural oil or alternatively any partially hydrogenated oil can be used in the transesterification process. Examples of oils include but are not limited to soybean, corn, cottonseed, peanut, castor, sunflower, canola, rapeseed, safflower, fish, seal, palm, tung, olive oil or any blend. Any multifunctional hydroxyl compound can also be used such as lactose, maltose, raffinose, sucrose, sorbitol, xylitol, erythritol, mannitol, or any combination.

Other suitable polyols include amine polyether polyols such as Mannich polyols. Mannich polyols are obtained by the condensation reaction of: 1) carbonylic compound, 2) a primary or secondary amine and 3) organic compound with enolyzable acidic hydrogen such as phenols, ketones but most commonly phenol and substituted phenols. The Mannich bases can be used as initiators for alkoxylation reactions with ethylene oxide and propylene oxide giving amine containing polyether polyols called as Mannich polyols. Mannich polyols are also used in spray foam formulations to increase the reactivity of the system. Typical Mannich polyols are typically prepared by condensation of phenol with formaldehyde in the presence of hydroxyl containing amines such as diethanolamine, ethanolamine and the like.

Open cell flexible molded foams typically use a main or "base" polyether polyol. Polyether polyols include poly(alkylene oxide) polymers such as poly(ethylene oxide) and poly(propylene oxide) polymers and copolymers with terminal hydroxyl groups derived from polyhydric compounds, including diols and triols. These polyols can have a functionality of about 2 to about 8, about 2 to about 6 and typically about 2 to about 4. The polyols can also have a hydroxyl number from about 10 to about 900, and typically about 15 to about 600 and more typically about 20 to about 50. Flexible molded foams also use copolymer polyols as part of the overall polyol content in the foam composition with OH numbers typically in the range of 15 to 50, MW ranges typically from 1200 to 8000 and more typically 2000 to 6000 and % solids form 10% to 60%. Open cell low density spray foam typically use a polyether polyol with an average MW from 1500 to 6000 and OH number from 15 to 50. Polyols amounts are defined by pphp. There are 4 types of polyols above defined: standard polyol or polyether polyol which can be used in the range of about 100 pphp (the only polyol) to about 10 pphp. The copolymer polyol (CPP) can be used in the range of about 0 to about 80 pphp. The NOP (natural oil polyol) can be present from about 0 to about 40 pphp. Finally, the Mannich polyol is used in combination with other polyol and in a range from 0 pphp to 80 pphp, about 0 pphp to about 50 pphp and in some cases about 0 pphp to about 20 pphp.

Blowing Agents

In accordance with the compositions, foam formulations, and methods of producing PIR/PUR foam within the scope of the present invention, suitable blowing agents that can be used alone or in combination include, but are not limited to, water, methylene chloride, acetone, hydrofluorocarbons (HFCs), hydrochlorocarbons (HCCs), hydrofluoroolefins (HFOs), chlorofluoroolefins (CFOs), hydrochloroolefins (HCOs), hydrofluorochloroolefins (HFCOs), hydrochlorofluorocarbons (HCFCs), chloroolefins, formates, and hydrocabons. Examples of HFCs include, but are not limited to, HFC-245fa, HFC-134a, and HFC-365; illustrative examples of HCFCs include, but are not limited to, HCFC-141b, HCFC-22, and HCFC-123. Exemplary hydrocarbons include, but are not limited to, n-pentane, iso-pentane, cyclopentane, and the like, or any combination thereof. In one aspect of the present invention, the blowing agent or mixture of blowing agents comprises at least one hydrocarbon. In another aspect, the blowing agent comprises n-pentane. Yet, in another aspect of the present invention, the blowing agent consists essentially of n-pentane or mixtures of n-pentane with one or more blowing agents. Examples of hydrohaloolefin blowing agents are HFO-1234ze (trans-1,3,3,3-Tetrafluoroprop-1-ene), HFO-1234yf (2,3,3,3-Tetrafluoropropene) and HFCO-1233zd (1-Propene, 1-chloro-3,3,3-trifluoro), among other HFOs.

Due to the discovery that chlorofluorocarbons (CFCs) can deplete ozone in the stratosphere, this class of blowing agents is not desirable for use in general. A chlorofluorocarbon (CFC) is an alkane in which all hydrogen atoms are substituted with chlorine and fluorine atoms. Examples of CFCs include trichlorofluoromethane and dichlorodifluoromethane.

The amount of blowing agent used can vary based on, for example, the intended use and application of the foam product and the desired foam stiffness and density. In the compositions, foam formulations and methods for preparing a polyisocyanurate/polyurethane foam of the present invention, the blowing agent is present in amounts from about 5 to about 80 parts by weight per hundred weight parts of the at least one active hydrogen-containing compound. In another aspect, the blowing agent is present in amounts from about 10 to about 60, from about 15 to about 50, or from about 20 to about 40, parts by weight per hundred weight parts of the at least one active hydrogen-containing compound. If the at least one active hydrogen-containing compound is an at least one polyol, the blowing agent is present in amounts from about 5 to about 80 parts by weight per hundred weight parts polyol (pphp), from about 10 to about 60 pphp, from about 15 to about 50 pphp, or from about 20 to about 40 pphp.

If water is present in the formulation, for use as a blowing agent or otherwise, water is present in amounts up to about 60 parts by weight per hundred weight parts of the at least one active hydrogen-containing compound. Likewise, if the at least one active hydrogen-containing compound is an at least one polyol, water can range from 0 to about 15 pphp. In another aspect, water can range from 0 to about 10 pphp, from 0 to about 8 pphp, from 0 to about 6 pphp, or from 0 to about 4 pphp.

Urethane Catalyst

Conventional urethane catalysts having no isocyanate reactive group can be employed to accelerate the reaction to form polyurethanes, and can be used as a further component of the catalyst systems and compositions of the present invention to produce polyisocyanurate/polyurethane foam. Urethane catalysts suitable for use herein include, but are not limited to, metal salt catalysts, such as organotins, and amine compounds, such as triethylenediamine (TEDA), N-methylimidazole, 1,2-dimethyl-imidazole, N-methylmorpholine (commercially available as the DABCO® NMM catalyst), N-ethylmorpholine (commercially available as the DABCO® NEM catalyst), triethylamine (commercially available as the DABCO® TETN catalyst), N,N'-dimethylpiperazine, 1,3,5-tris(dimethylaminopropyl)hexahydrotriazine (commercially available as the Polycat® 41 catalyst), 2,4,6-tris(dimethylaminomethyl)phenol (commercially available as the DABCO TMR® 30 catalyst), N-methyldicyclohexylamine (commercially available as the Polycat® 12 catalyst), pentamethyldipropylene triamine (commercially available as the Polycat® 77 catalyst), N-methyl-N'-(2-dimethylamino)-ethyl-piperazine, tributylamine, pentamethyl-diethylenetriamine (commercially available as the Polycat® 5 catalyst), hexamethyl-triethylenetetramine, heptamethyltetraethylenepentamine, dimethylaminocyclohexyl-amine (commercially available as the Polycat® 8 catalyst), pentamethyldipropylene-triamine, triethanolamine, dimethylethanolamine, bis(dimethylaminoethyl) ether (commercially available as the DABCO® BL19 catalyst), tris(3-dimethylamino)-propylamine (commercially available as the Polycat® 9 catalyst), 1,8-diazabicyclo [5.4.0] undecene (commercially available as the DABCO® DBU catalyst) or its acid blocked derivatives, and the like, as well as any mixture thereof. Particularly useful as a urethane catalyst for foam applications related to the present invention is the Polycat® 5 catalyst, which is known chemically as pentamethyldiethylenetriamine.

For preparing a polyisocyanurate/polyurethane foam of the present invention, the urethane catalyst can be present in the formulation from 0 to about 10 pphp, from 0 to about 8 pphp, from 0 to about 6 pphp, from 0 to about 4 pphp, from 0 to about 2 pphp, or from 0 to about 1 pphp. In another aspect, the urethane catalyst is present from 0 to about 0.8 pphp, from 0 to about 0.6 pphp, from 0 to about 0.4 pphp, or from 0 to about 0.2 pphp.

Miscellaneous Additives

Depending upon the requirements during foam manufacturing or for the end-use application of the foam product, various additives can be employed in the PIR/PUR foam formulation to tailor specific properties. These include, but are not limited to, cell stabilizers, flame retardants, chain extenders, epoxy resins, acrylic resins, fillers, pigments, or any combination thereof. It is understood that other mixtures or materials that are known in the art can be included in the foam formulations and are within the scope of the present invention.

Cell stabilizers include surfactants such as organopolysiloxanes. Silicon surfactants can be present in the foam formulation in amounts from about 0.5 to about 10 pphp, about 0.6 to about 9 pphp, about 0.7 to about 8 pphp, about 0.8 to about 7 pphp, about 0.9 to about 6 pphp, about 1 to about 5 pphp, or about 1.1 to about 4 pphp. Useful flame retardants include halogenated organophosphorous compounds and non-halogenated compounds. A non-limiting example of a halogenated flame retardant is trichloropropylphosphate (TCPP). For example, triethylphosphate ester (TEP) and DMMP are non-halogenated flame retardants. Depending on the end-use foam application, flame retardants can be present in the foam formulation in amounts from 0 to about 50 pphp, from 0 to about 40 pphp, from 0 to about 30 pphp, or from 0 to about 20 pphp. In another aspect, the flame retardant is present from 0 to about 15 pphp, 0 to about 10 pphp, 0 to about 7 pphp, or 0 to about 5 pphp. Chain extenders such as ethylene glycol and butane diol can also be employed in the present invention. Ethylene glycol, for instance, can also be present in the formulation as a diluent or solvent for the carboxylate salt catalysts of the present invention.

A variety of other ingredients may be included in the formulations for making foams according to the invention. Examples of optional components include, but are not limited to, cell stabilizers, crosslinking agents, chain extenders, pigments, fillers, flame retardants, auxiliary urethane gelling catalysts, auxiliary urethane blowing catalysts, transition metal catalysts, alkali and alkali earth carboxylate salts and combinations of any of these.

Cell stabilizers may include, for example, silicone surfactants as well as organic, anionic, cationic, zwiterionic or nonionic surfactants. Examples of suitable silicone surfactants include, but are not limited to, polyalkylsiloxanes, polyoxyalkylene polyol-modified dimethylpolysiloxanes, alkylene glycol-modified dimethylpolysiloxanes, or any combination thereof. Suitable anionic surfactants include, but are not limited to, salts of fatty acids, salts of sulfuric acid esters, salts of phosphoric acid esters, salts of sulfonic acids, and combinations of any of these. Suitable cationic surfactants include, but are not limited to quaternary ammonium salts (pH dependent or permanently charged) such as cetyl trimethylammonium chloride, cetyl pyridinium chloride, polyethoxylated tallow amine, benzalkonium chloride, benzethonium chloride and the like. Suitable zwiterionic or amphoteric surfactants include but are not limited to sultaines, aminoacids, imino acids, betaines and phosphates. Suitable non-ionic surfactants include but are not limited to fatty alcohols, polyoxyethylene glycol alkyl ethers, polyoxypropylene glycol alkyl ethers, glucosides (such as decyl, lauryl and octyl glucosides), polyoxyethylene glycol alkyl phenol ethers, glycol alkyl esters, and the like.

Crosslinking agents include, but are not limited to, low-molecular weight compounds containing at least two moieties selected from hydroxyl groups, primary amino groups, secondary amino groups, and other active hydrogen-containing groups which are reactive with an isocyanate group. Crosslinking agents include, for example, polyhydric alcohols (especially trihydric alcohols, such as glycerol and trimethylolpropane), polyamines, and combinations thereof. Non-limiting examples of polyamine crosslinking agents include diethyltoluenediamine, chlorodiaminobenzene, diethanolamine, diisopropanolamine, triethanolamine, tripropanolamine, 1,6-hexanediamine, and combinations thereof. Typical diamine crosslinking agents comprise twelve carbon atoms or fewer, more commonly seven or fewer.

Examples of chain extenders include, but are not limited to, compounds having hydroxyl or amino functional group, such as glycols, amines, diols, and water. Specific non-limiting examples of chain extenders include ethylene glycol, diethylene glycol, propylene glycol, dipropylene glycol, 1,4-butanediol, 1,3-butanediol, 1,5-pentanediol, neopentyl glycol, 1,6-hexanediol, 1,10-decanediol, 1,12-dodecanediol, ethoxylated hydroquinone, 1,4-cyclohexanediol, N-methylethanolamine, N-methylisopropanolamine, 4-aminocyclohexanol, 1,2-diaminoethane, 2,4-toluenediamine, or any mixture thereof. Pigments may be used to color code the polyurethane foams during manufacture, for example to identify product grade or to conceal yellowing. Pigments may include any suitable organic or inorganic pigments known in the polyurethane art. For example, organic pigments or colorants include, but are not limited to, azo/diazo dyes, phthalocyanines, dioxazines, and carbon black. Examples of inorganic pigments include, but are not limited to, titanium dioxide, iron oxides, or chromium oxide.

Fillers may be used to increase the density and load bearing properties of polyurethane foams. Suitable fillers include, but are not limited to, barium sulfate or calcium carbonate.

Flame retardants may be used to reduce the flammability of polyurethane foams. For example, suitable flame retardants include, but are not limited to, chlorinated phosphate esters, chlorinated paraffins, or melamine powders.

Cell stabilizers can be used in an amount from about 0.1 to about 20 pphp and typically from about 0.1 to about 10 pphp and, in some cases, from about 0.1 to about 5.0 pphp. Crosslinking agents can be used in an amount from about 0 pphp (no crosslinker) to about 20 pphp. Chain extenders can be used in an amount from about 0 pphp (no chain extender) to about 20 pphp. Fillers can be used in an amount from about 0 pphp (no fillers) to 40 pphp. Fire retardants can be used in an amount from about 0 to about 20 pphp and from about 0 to about 10 pphp and from about 0 to about 5 pphp.

In one aspect of the invention, the catalyst composition, foam manufacturing process and resultant foam are substantially free of amines. By "substantially free" it is meant that the foregoing contain less than about 10 pphp, typically less than about 5 pphp and in some cases 0 pphp of amines.

In another aspect of the invention, the catalyst, composition, foam manufacturing process and resultant foam are substantially free of toxic and/or emissive transition metal compounds based on Sn, Hg, Pb, Bi, Zn, among others. By "substantially free" it is meant that the foregoing contain less than about 10 pphp, typically less than about 5 pphp and in some cases 0 pphp of such metals.

Polyurethane Foam Formulation and Process

One aspect of the present invention provides for a composition comprising the contact product of at least one active hydrogen-containing compound, at least one blowing agent, and at least one catalyst composition as defined above in a or b or c or d.

Another aspect provides a composition comprising the contact product of at least one polyisocyanate, at least one blowing agent, and at least one catalyst composition as defined above in a or b or c or d used in combination with at least one tertiary amine having at least one isocyanate reactive group.

Another aspect provides a composition comprising the contact product of at least one polyisocyanate, at least one blowing agent, and at least one catalyst composition as defined above in a or b or c or d used in combination with at least one tertiary amine having no isocyanate reactive group.

The composition can further comprise the catalyst composition as defined above in a or b or c or d with at least one urethane catalyst having no isocyanate reactive group and at least one urethane catalyst having an isocyanate reactive group. Likewise, the compositions can further comprise at least one additive selected from at least one cell stabilizer, at least one flame retardant, at least one chain extender, at least one epoxy resin, at least one acrylic resin, at least one filler, at least one pigment, or any combination thereof.

The present invention provides a method for preparing a polyurethane foam as well as a polyisocyanurate/polyurethane (PIR/PUR) foam which comprises contacting at least one polyisocyanate with at least one active hydrogen-containing compound, in the presence of at least one blowing agent and an effective amount of catalyst composition as defined above in a or b or c or d. In accordance with the method of the present invention, PUR as well as PIR/PUR foams can be produced having a density from about 16 $Kg/m^3$ to about 250 $Kg/m^3$ (about 0.5 $lb/ft^3$ to about 15.5 $lb/ft^3$), or from about 24 $Kg/m^3$ to about 60 $Kg/m^3$ (about 1.5 $lb/ft^3$ to about 3.75 $lb/ft^3$).

The instant invention can be used in a wide range of methods for making rigid closed-cell foams as well as rigid open cell foams. Examples of suitable methods comprise molding, spraying, among other rigid foam production methods. In one aspect the inventive method relates to a method for making a laminated foam. The inventive foam can be laminated to a wide range of substrates including wood, steel, paper and plastic.

The method for preparing PUR as well as PIR/PUR foams also can provide equivalent or faster surface cure when compared to other commercially available catalyst systems, such that the PUR as well as the PIR/PUR foam has enhanced surface adherence, useful for the production of articles such as laminated foam panels.

Optionally, in yet another aspect, the method of the present invention can produce PUR as well as PIR/PUR foams with no or substantially no undesirable amine odor. In a still further aspect, the method of the present invention produces PIR/PUR foam that is substantially free of volatile amines and/or amine odors.

The catalyst composition as defined above in a or b or c or d should be present in the foam formulation in a catalytically effective amount. In PUR as well as in PIR/PUR foam formulations of the present invention, the catalyst composition is present in amounts from about 0.05 to about 20 parts by weight per hundred weight parts of the at least one active hydrogen-containing compound, excluding the weight contribution of the catalyst system diluent. In another aspect, the catalyst composition is present in amounts from about 0.4 to about 10 parts, or from about 0.8 to about 8 parts, by weight per hundred weight parts of the at least one active hydrogen-containing compound. If the at least one active hydrogen-containing compound is an at least one polyol, the catalyst composition is present in amounts from about 0.05 to about 10 parts by weight per hundred weight parts polyol (pphp). In another aspect, the catalyst composition is present in amounts from about 0.2 to about 9.5 pphp, about 0.4 to about 9 pphp, about 0.6 to about 8.5 pphp, or about 0.8 to about 8 pphp.

In accordance with one aspect of the method of the present invention, the components of the foam formulation are contacted substantially contemporaneously. For example, at least one polyisocyanate, at least one active hydrogen-containing compound, at least one blowing agent and an effective amount of catalyst composition as defined above in a or b or c or d, are contacted together. Given the number of components involved in PUR and PIR/PUR formulations, there are many different orders of combining the components, and one of skill in the art would realize that varying the order of addition of the components falls within the scope of the present invention. As well, for each of the different orders of combining the aforementioned components of the foam formulation, the foam formulation of the present invention can further comprise at least one urethane catalyst. In addition, the method of producing PIR/PUR foams can further comprise the presence of at least one additive selected from at least one cell stabilizer, at least one flame retardant, at least one chain extender, at least one epoxy resin, at least one acrylic resin, at least one filler, at least one pigment, or any combination thereof. In one aspect of the present invention, all of the components, including optional components, are contacted substantially contemporaneously.

In another aspect of the present invention, a premix of ingredients other than the at least one polyisocyanate are contacted first, followed by the addition of the at least one polyisocyanate. For example, the at least one active hydrogen-containing compound, the at least one blowing agent, and the catalyst composition of the present invention are contacted initially to form a premix. The premix is then contacted with the at least one polyisocyanate to produce PUR or PIR/PUR foams in accordance with the method of the present invention. In a further aspect of the present invention, the same method can be employed, wherein the premix further comprises at least one urethane catalyst. Likewise, the premix can further comprise at least one additive selected from at least one cell stabilizer, at least one flame retardant, at least one chain extender, at least one epoxy resin, at least one acrylic resin, at least one filler, at least one pigment, or any combination thereof.

One aspect of the present invention provides a method for preparing a polyisocyanurate/polyurethane foam comprising
(a) forming a premix comprising:
  i) at least one polyol;
  ii) about 10 to about 80 parts by weight per hundred weight parts of the polyol (pphp) blowing agent;
  iii) about 0.5 to about 10 pphp silicon surfactant;
  iv) zero to about 60 pphp water;
  v) zero to about 50 pphp flame retardant;
  vi) zero to about 10 pphp urethane catalyst; and
  vii) about 0.05 to about 20 pphp of a catalyst composition as defined above in a or b or c or d; and
(b) contacting the premix with at least one polyisocyanate at an Isocyanate Index from about 10 to about 800.

EXAMPLES

These Examples are provided to demonstrate certain aspects of the invention and shall not limit the scope of the claims appended hereto.

Example 1 through 15 describe the syntheses and compositions of thirteen catalysts and two intermediates formed in accordance with the instant invention.

Example 1

This example describes the synthesis of N-2-cyanoethyl-imidazole (CE-IM) as an intermediate to prepare some catalysts of this invention.

Imidazole (300 g) and water (60 g) were charged into a stainless steel reactor equipped with mechanical stirrer, heating mantle, cooling coil and a high pressure syringe pump connected with stainless steel feeding lines. Then the steel reactor was sealed and purged with $N_2$ for three times. The temperature of the reactor was increased to 50° C. and stirred for 30 min to help dissolve all the imidazole. Acrylonitrile (304.6 mL) was then charged into the reactor from a high pressure syringe pump at a speed of 150 mL/hour while maintaining the reactor temperature at 50° C. Once addition was completed the reactor was held at 50° C. for ~10 hours before the heating was shut down. The reactor was then vented after cooling to room temperature. All volatiles were removed on a rotary evaporator under vacuum. CE-IM was collected in 98.5% yield and 100% purity based on GC and GCMS analyses.
CE-IM is

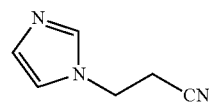

Example 2

This example describes the synthesis of N-(3-aminopropyl)-imidazole (AP-IM) as an intermediate to prepare some catalysts of this invention.

Isopropyl alcohol (IPA, 400 mL) and Raney cobalt (16 g) were charged into a stainless steel reactor equipped with mechanical stirrer, heating mantle, cooling coil and a high pressure syringe pump connected with stainless steel feeding lines. Then the steel reactor was sealed and purged with $N_2$ for three times followed by $H_2$ for three times while stirring. CE-IM (806 g) was charged into the high pressure syringe pump. The reactor was heated to 100° C. and the $H_2$ gas pressure was adjusted to 800 psi. CE-IM was dispensed from the pump into the reaction over ~4 h period. After all CE-IM was dispensed, the reaction was held at 100° C. for 1 hour before the heating was shut down. The reactor was then vented after cooling to room temperature. All volatiles were removed on rotary evaporator under reduced pressure. The catalyst was removed via pressure filter. The final product was collected in 97% yield, and in 97.5% purity along with 2.5% bis-(3-imidazolylpropyl)-amine based on GC and GCMS analyses.
AP-IM is

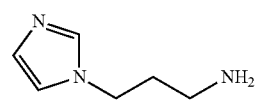

bis-(3-imidazolylpropyl)-amine is

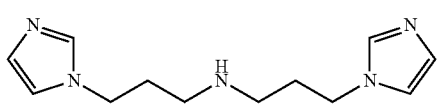 [SMILES: c1cn(CCCNCCCn2ccnc2)cn1]

Example 3

This example describes the synthesis of Product 1A (defined below) as a catalyst of this invention.

IPA (200 mL) and 5% Pd/C (containing 50% water, 25.6 g) were charged into a stainless steel reactor equipped with mechanical stirrer, heating mantle, cooling coil and a high pressure syringe pump connected with stainless steel feeding lines. The steel reactor was sealed and purged with N₂ three times followed by H₂ three times while stirring. CE-IM (416.6 g) was charged into the high pressure syringe pump. Dimethylamine (DMA, 450.1 g) was then transferred into the reactor. The reactor was heated to 80° C. and the H₂ gas pressure was adjusted to 800 psi. All CE-IM was dispensed from a high pressure syringe pump into the reactor for over ~4 h. Once CE-IM was dispensed, ~30 mL IPA was charged into the pump and dispensed into the reactor over 1 min, and this process was repeated for two more times to make sure all leftover CE-IM was washed into the reactor. The reactor was then held for an additional hour before the heating was shut down. The reactor was then vented after cooling to room temperature. The catalyst was removed via pressure filter. All volatiles were removed on a rotary evaporator under reduced pressure. 512.2 g of the final product, "Product 1A", was collected as 99.8% N,N-dimethylaminopropylimidazole along with 0.2% bis-(3-imidazolylpropyl)-amine based on GC and GCMS analyses.

N,N-dimethylaminopropylimidazole is

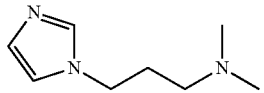

Example 4

This example describes the synthesis of Product 1B (defined below) as a catalyst of this invention.

AP-IM (208.2 g, made in example 2) and 15% Pd/C (contains 50% water, 4.2 g) were charged into a stainless steel reactor equipped with mechanical stirrer, heating mantle, cooling coil and a high pressure syringe pump connected with stainless steel feeding lines. Then the steel reactor was sealed and purged with N₂ for three times followed by H₂ for three times while stirring. 37% formaldehyde aqueous solution in water (806 g) was charged into the high pressure syringe pump. Reactor was heated to 120° C. and H₂ gas pressure was adjusted to 800 psi. Formaldehyde aqueous solution was dispensed into the reactor at a speed of 115 mL/hour until no more H₂ uptake was observed (~135 min). The reaction was then held at 120° C. for another hour before the heating was shut down. The reactor was then vented after cooling to room temperature. The catalyst was removed via pressure filter. All volatiles were removed on rotary evaporator under reduced pressure. The final product, "Product 1B", was collected in 96.7% yield containing 96.4% N,N-dimethylaminopropylimidazole along with 2.4% N,N-bis-(3-imidazolylpropyl)-N-methylamine based on GC and GCMS analyses.

N,N-bis-(3-imidazolylpropyl)-N-methylamine is

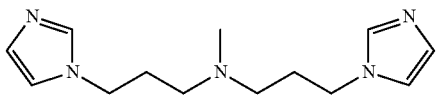 [SMILES: CN(CCCn1ccnc1)CCCn1ccnc1]

Example 5

This example describes the synthesis of Product 2 (defined below) as a catalyst of this invention.

CE-IM (223.8 g), water (11.3 g) and 5% Pd/Al₂O₃ (9.0 g) were charged into a stainless steel reactor equipped with mechanical stirrer, heating mantle, cooling coil and a high pressure syringe pump connected with stainless steel feeding lines. The steel reactor was sealed, purged with N₂ for three times followed by three times purge with H₂ gas while stirring. 37% formaldehyde aqueous solution was charged into a high pressure syringe pump. Reactor was heated to 90° C. and H₂ gas pressure adjusted to 800 psi. Reaction was stirred with mechanical agitation for 2 hours until no more H₂ gas uptake was observed (~8 hours). Once at room temperature, reactor was vented and purged first with N₂ gas and then with H₂ gas while stirring. The reactor was heated to 120° C. and the pressure of H₂ was set to 800 psi. Formaldehyde aqueous solution was dispensed into the reaction at a speed of 80 mL/hour until the H₂ uptake is completed after ~2.5 hours. Reaction was held at the same condition for an hour before the heating was shut down. The reactor was vented after cooling to room temperature. The catalyst was removed via pressure filter. All volatiles were removed on rotary evaporator under reduced pressure. 195.5 g of the final product, "Product 2", was collected as a mixture of material containing imidazole (0.6%), N,N-dimethylaminopropylimidazole (3.2%), N,N-bis-(3-imidazolylpropyl)-N-methylamine (68%) and N,N,N,-tris-(3-imidazolylpropyl)-amine (26%) based on GC and GCMS analyses.

N,N,N,-tris-(3-imidazolylpropyl)-amine is

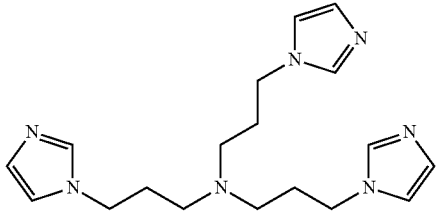 [SMILES: c1cn(CCCN(CCCn2ccnc2)CCCn2ccnc2)cn1]

Example 6

This example describes the synthesis of Product 3 (defined below) as a catalyst of this invention.

CE-IM (223.8 g) and 5% Pd/C (contains 50% water, 4.5 g) were charged into a stainless steel reactor equipped with mechanical stirrer, heating mantle, cooling coil and a high pressure syringe pump connected with stainless steel feeding lines. Following the procedure of Example 5, yielded 134.7 g of the final product, "Product 3", collected as a mixture of material containing imidazole (1.1%), CE-IM (8.7%), N,N-dimethylaminopropylimidazole (1.1%), N,N-bis-(3-imidazolylpropyl)-N-methylamine (39%) and N,N,N,-tris-(3-imidazolylpropyl)-amine (45%) based on GC analysis.

Example 7

This example describes the synthesis of Product 4 (defined below) as a catalyst of this invention.

CE-IM (223 g) and Raney nickel (12.2 g) were charged into a stainless steel reactor equipped with mechanical stirrer, heating mantle, cooling coil and a high pressure syringe pump connected with stainless steel feeding lines. Following the procedure of example 5 but feeding the 37% formaldehyde aqueous solution at 120 ml/hour yielded 239.7 g of the final product, "Product 4", collected as a mixture of material containing imidazole (1.2%), N,N-dimethylaminopropylimidazole (57%) and N,N-bis-(3-imidazolylpropyl)-N-methylamine (36%) based on GC analysis.

Example 8

This example describes the synthesis of Product 5 (defined below) as a catalyst of this invention.

CE-IM (500.8 g) and Raney cobalt (15.1 g) are charged into a stainless steel reactor equipped with mechanical stirrer, heating mantle, cooling coil and a high pressure syringe pump connected with stainless steel feeding lines. Following the procedure of example 5 but feeding the 37% formaldehyde aqueous solution at 200 ml/hour yielded 577.8 g of the final product, "Product 5", collected as a mixture of material containing N,N-dimethylaminopropylimidazole (73%) and N,N-bis-(3-imidazolylpropyl)-N-methylamine (20%) based on GC analysis.

Example 9

This example describes the synthesis of Product 6 (defined below) as a catalyst of this invention.

AP-IM (528 g) and 5% Pd/C (contains 50% water, 20 g) were charged into a stainless steel reactor equipped with mechanical stirrer, heating mantle, cooling coil and a high pressure syringe pump connected with stainless steel feeding lines. Then the steel reactor was sealed and purged with $N_2$ for three times followed by $H_2$ for three times while stirring, before it was left under 5 psi of $H_2$ pressure. Benzaldehyde (425 mL) was charged into the reactor through a high pressure syringe pump over 20 min while maintaining the reactor temperature at 30° C. Reactor was heated to 60° C. and $H_2$ gas pressure adjusted to 200 psi. Reactor was maintained under these conditions until the $H_2$ uptake was completed (~1 hours). The reactor temperature was then increased to 80° C. and the $H_2$ gas pressure was adjusted to 400 psi, before 37% of aqueous formaldehyde solution was dispensed into the reactor at a speed of 200 mL/hour until the $H_2$ gas uptake stopped after ~100 min. The reaction was kept at the same temperature and pressure for ~2 hours before the heating was shut down. The reactor was then vented after cooling to room temperature. The catalyst was removed via pressure filter. All volatiles were removed on rotary evaporator under reduced pressure, and 878.7 g of the final product, "Product 6", was collected as a mixture containing 96% N-benzyl-N-(3-imidazolylpropyl)-N-methylamine, 0.7% benzyl alcohol, 1.9% N,N-dimethylaminopropylimidazole and 0.9% N,N-bis-(3-imidazolylpropyl)-N-methylamine based on GC analysis.

N-benzyl-N-(3-imidazolylpropyl)-N-methylamine is

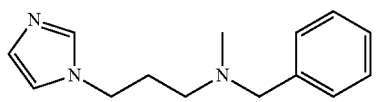 [SMILES: CN(CCCn1ccnc1)Cc1ccccc1]

Example 10

This example describes the synthesis of Product 7 (defined below) as a catalyst of this invention.

Methylvaniline (150 g), 5% Pd/C (contains 50% water, 4.8 g) and tetrahydrofuran (THF, 200 mL) were charged into a stainless steel reactor equipped with mechanical stirrer, heating mantle, cooling coil and a high pressure syringe pump connected with stainless steel feeding lines. The steel reactor was sealed and purged with $N_2$ for three times while stirring. Reactor was heated to 60° C. and temperature was held for 10 min while stirring before setting the temperature back to 30° C. AP-IM (109.8 mL) was then charged into the reactor through a high pressure syringe pump over 10 min while maintaining the reactor temperature at 30° C. Reactor was pressurized with 400 psig $H_2$ gas at 60° C. for 2 hours until $H_2$ gas uptake stopped (~3 hours). The reactor temperature was adjusted to 80° C. and $H_2$ gas pressure was adjusted to 400 psi followed by the addition of 37% formaldehyde aqueous solution through a high pressure syringe pump at a speed of 40 mL/hour until $H_2$ uptake was completed after ~110 min. Reaction was held at the same temperature and pressure for an additional 2 hours before the heating was shut down. The reactor was then vented after cooling to room temperature. The catalyst was removed via pressure filter. All volatiles were removed on rotary evaporator under reduced pressure, and 234.6 g of the final product, "Product 7", was collected as a mixture of material containing 73% N-(3,4-dimethoxybenzyl)-N-(3-imidazolepropyl)-N-methylamine, 1.6% methylvaniline, 1.6% 3,4-dimethoxybenzyl alcohol and 18.8% N,N-bis-(3,4-dimethoxybenzyl)-N-imidazolylpropyl amine based on GCMS analysis.

N-(3,4-dimethoxybenzyl)-N-(3-imidazolepropyl)-N-methylamine is

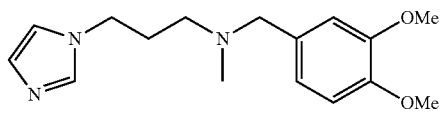 [SMILES: COc1ccc(CN(C)CCCn2ccnc2)cc1OC]

N,N-bis-(3,4-dimethoxybenzyl)-N-imidazolylpropyl amine is

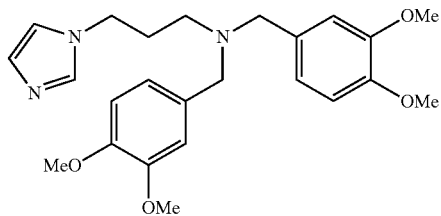 [SMILES: COc1ccc(CN(CCCn2ccnc2)Cc2ccc(OC)c(OC)c2)cc1OC]

Example 11

This example describes the synthesis of Product 8 (defined below) as a catalyst of this invention.

A solution of CE-IM in water (420.0 g, 90.2%) and 5% Pd/C (contains 50% water, 25.2 g) were charged into a stainless steel reactor equipped with mechanical stirrer, heating mantle, cooling coil and a high pressure syringe pump connected with stainless steel feeding lines. The steel reactor was sealed, purged with $N_2$ for three times followed by three times purge with $H_2$ gas while stirring. The reactor was then heated to 70° C. over 25 minutes under 100 psi $H_2$ pressure. The reaction was stirred for 2.5 hours before the pressure was increased to 400 psi and maintained for 40 minutes. The reaction was then held at 80° C. for 1 hour then at 90° C. for another hour before the heating was shut down. The reactor was vented and purged with $N_2$ for three times after cooling to room temperature. All content in the reactor was transferred into a pressure filter. The reactor was rinsed three times with a total of about 260 g of water and all rinses were added into the same pressure filter. The catalyst was removed via pressure filtration under 80 psi $N_2$ and 567 g of the final product, "Product 8", was collected as a mixture of material containing AP-IM (0.2%), bis-(3-imidazolylpropyl)-amine (19.6%), N,N,N,-tris-(3-imidazolylpropyl)-amine (29.2%) and water (48.3%) based on NMR and Karl Fischer analyses.

Example 12

This example describes the synthesis of Product 9 (defined below) as a catalyst of this invention.

A solution of CE-IM in water (420.1 g, 90.2%) and 15% Pd/C (contains 50% water, 8.4 g) were charged into a stainless steel reactor equipped with mechanical stirrer, heating mantle, cooling coil and a high pressure syringe pump connected with stainless steel feeding lines. The steel reactor was sealed, purged with $N_2$ for three times followed by three times purge with $H_2$ gas while stirring. 37% formaldehyde aqueous solution was charged into a high pressure syringe pump. The reactor was then heated to 70° C. over 25 minutes under 100 psi $H_2$ pressure. The reaction was stirred for 2.5 hours before the temperature was increased to 90° C. and pressure was increased to 400 psi. Reaction was stirred with mechanical agitation until no more $H_2$ gas uptake was observed (~3.5 hours) and then the heating was shut down. Once at room temperature, reactor was vented and purged first with $N_2$ gas for three times and then with $H_2$ gas for three times while stirring. The reactor was then heated to 120° C. and the pressure of $H_2$ was adjusted to 400 psi. Formaldehyde aqueous solution was dispensed into the reaction at a speed of 60 mL/hour until the $H_2$ uptake was completed after ~4 hours. Reaction was held at the same condition for an hour before the heating was shut down. The reactor was vented and all content in the reactor was transferred into a pressure filter. The reactor was rinsed three times with a total of about 155 g of water and all rinses were added into the same pressure filter. The catalyst was removed via pressure filtration under 80 psi $N_2$. Excess formaldehyde in the filtrate was removed on rotary evaporator under reduced pressure (200~100 torr, 60° C. water bath, 2 hours). 636 g of the final product, "Product 9", was collected as a mixture of material containing hexamethylenetetramine (2.2%), N,N-dimethylaminopropylimidazole (1.1%), N,N-bis-(3-imidazolylpropyl)-N-methylamine (13.1%), N,N,N,-tris-(3-imidazolylpropyl)-amine (36.1%) and water (41.0%) based on NMR and Karl Fischer analyses.
Hexamethylenetetramine is

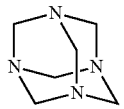

Example 13

This example describes the synthesis of Product 10 (defined below) as a catalyst of this invention.

IPA (200 mL) and 15% Pd/C (containing 50% water, 2.1 g) were charged into a stainless steel reactor equipped with mechanical stirrer, heating mantle, cooling coil and a high pressure syringe pump connected with stainless steel feeding lines. The steel reactor was sealed and purged with $N_2$ three times followed by $H_2$ three times while stirring. A solution of CE-IM in water (310.6 g, 93.2%) was charged into the high pressure syringe pump. Methylamine (MMA, 33.7 g) was then transferred into the reactor. The reactor was heated to 90° C. and the $H_2$ gas pressure was adjusted to 400 psi. All CE-IM was dispensed from a high pressure syringe pump into the reactor for over ~4 h. Once CE-IM was dispensed, the reactor was held for an additional hour before the heating was shut down. The reactor was then vented after cooling to room temperature, and then purged with $N_2$ for three times followed by $H_2$ for three times. Reactor was heated to 120° C. and $H_2$ gas pressure was adjusted to 800 psi. A 37% aqueous formaldehyde solution was dispensed into the reactor at a speed of 120 mL/hour until the $H_2$ consumption from ballast is below 3 psi/min. The reaction was then held at 120° C. for another hour before the heating was shut down. The reactor was then vented after cooling to room temperature. The catalyst was removed via pressure filter. All volatiles were removed on a rotary evaporator under reduced pressure. 80.7 g of water was then added to the material to redissolve some solid formed during rotary evaporation. The final product, "Product 10", was collected as a mixture of material containing hexamethylenetetramine (3.1%), N,N-dimethylaminopropylimidazole (5.2%), N,N-bis-(3-imidazolylpropyl)-N-methylamine (64.8%), N,N,N,-tris-(3-imidazolylpropyl)-amine (1.6%) and water (22.5%) based on NMR and Karl Fischer analyses.

Example 14

This example describes the synthesis of Product 11 (defined below) as a catalyst of this invention.

Product 1A (200.0 g) was charged into an 1 L 4-neck glass reactor equipped with mechanical stirrer, thermal couple, addition funnel and condenser. The addition funnel was filled with formic acid and cold water was running through the condenser. Nitrogen gas is flowing from the top of the addition funnel into the system and out from the top of condenser. 60.9 g formic acid was added into the reactor while stirring via the addition funnel over 1 hour. The reaction was then stirred for one hour and then cooled to room temperature. After transferring to a glass jar, 249.1 g of Product 11 (N,N-dimethylaminopropylimidazole formate) was collected as a slight viscous pale yellow liquid containing 0.78% water based on Karl Fischer analysis.

Example 15

This example describes the synthesis of Product 12 (defined below) as a catalyst of this invention.

Succinic acid (77.0 g) and ethylene glycol (77.0 g) was charged into an 1 L 4-neck glass reactor equipped with mechanical stirrer, thermal couple, addition funnel and condenser. The addition funnel was filled with Product 1 Å and cold water was running through the condenser. Nitrogen gas was flowing from the top of the addition funnel into the system and out from the top of condenser. The reaction was heated to 60° C. and held for 30 minutes before cooled to room temperature using a water bath. 200.0 g Product 1A was added into the reactor while stirring via the addition funnel over 15 minutes, and the reaction temperature raised to 37° C. due to exotherm. The reaction was then heated to 50° C. and held for 90 minutes. After cooling to room temperature, the clear material was transferred to a glass jar. 334.0 g of Product 12 (N,N-dimethylaminopropylimidazole succinate ethylene glycol solution) was collected as a viscous amber color liquid containing 0.32% water based on Karl Fischer analysis.

Examples 16 and 17 describe the method and result of lab adhesion testing by using a lamination formulation.

Example 16

Use Levels for Lamination Formulation

Using the formulation shown in Table 1 below, a master batch of premix-1 (1,150 g) was prepared in a 1.89 L Nalgene container by mixing all the ingredients except the isocyanate, blowing agent and catalyst for 15 seconds with a 7.6 cm mixing blade at roughly 3000 rpms using an Indco Mixer, model HSL-4. A master batch premix-2 (929.1 g) was prepared in a separate 950 mL Nalgene container by mixing isocyanate (Rubinate M, 900.6 g) and blowing agent (n-pentane, 28.5 g). The lid was tightly closed on the 950 mL container and the bottle was shaken vigorously for 30 seconds to blend the isocyanate and pentane. 149.5 g of premix-1 was weighed out into a 1.89 L paper cup and catalyst was added (the weight of catalyst varied and the final use level of each catalyst that provided matched activity was summarized in Table 2) and mixed for 15 seconds using the same blade at roughly 3000 rpms. 211.9 g of premix-2 was added to the paper cup containing the mixture of premix-1 and the catalyst. All components were then mixed using the same blade at roughly 3000 rpms, for 6 seconds. This mixture was then poured into a paper bucket (the mixing cup has a height of 20.2 cm and a bottom diameter of 15.5 cm and the top diameter is 21.8 cm), and then the bucket was placed under FOMAT sonar equipment (Format Messtechnik GmbH) with standard software, to measure the change in height (mm) vs time (seconds) using FOAM software version 3.5/10. Using the FOMAT software, cream time (CT) was first recorded followed by top of the cup (TOC) in seconds once the foaming mass reach the top edge of the bucket. String gel time (SGT, defined as the time in seconds at which the polymerizing mass is able to form polymer strings when touched with a wooden tongue suppressor) was then determined and recorded. Dabco®2039 was the standard catalyst for the formulation in Table 1 and the use level of Dabco®2039 was 1.70 pphp when SGT was 80 seconds. The use levels in pphp for the experimental catalysts were adjusted to match 80 second SGT. Results were summarized in Table 2.

TABLE 1

Rigid Adhesion Lamination Formulation

| Component | pphp | Notes |
|---|---|---|
| Pluracol SG360 Polyol | 50.00 | Sucrose/glycerine polyol with 360-375 OH value supplied by BASF |
| Stepanpol PS2352 | 50.00 | Aromatic polyester polyol with 230-250 OH value supplied by Stepan Company |
| Fyrol PCF | 10.00 | Tris(2-chloroisopropyl) phosphate flame retardant supplied by ICL Industrial Products |
| Dabco DC193 | 2.00 | Silicone surfactant supplied by Evonik |
| Water | 3.00 | |
| Catalyst | Varied | |
| n-Pentane | 5.00 | Blowing agent |
| Rubinate M | 158.00 | MDI supplied by Huntsman |

TABLE 2

Catalyst Use Level to Get Approximately 80 Seconds SGT

| Catalyst | pphp | Note |
|---|---|---|
| Dabco ®2039 | 1.80 | 50% solution of 1,2-dimethylimidazole in dipropylene glycol supplied by Evonik |
| BDMA | 3.10 | N,N-Dimethylbenzylamine supplied by Sigma Aldrich |
| Polycat ®77 | 0.70 | Polyurethane catalyst, known chemically as pentamethyldipropylenetriamine supplied by Evonik |
| Polycate ®5 | 0.55 | Polyurethane catalyst, known chemically as pentamethyldiethylenetriamine supplied by Evonik |
| Amicure ®AMI-1 | 1.25 | 1-Methylimidazole supplied by Evonik |
| Product 1B | 1.55 | Product of example 4 |
| Product 2 | 1.72 | Product of example 5 |
| Product 3 | 2.00 | Product of example 6 |
| Product 4 | 1.65 | Product of example 7 |
| Product 5 | 1.46 | Product of example 8 |
| Product 6 | 3.47 | Product of example 9 |
| Catalyst 7 | 1.70 | Mixture of Product 7 (1.0 part) in example 10 and Polycat ®77 (0.7 part) |

Example 17

Adhesion Testing of Rigid Molded Foam on Paper

A non-heated 50.8 cm×50.8 cm×5.1 cm mold was internally covered by a facer typically used in lamination applications with one side of the facer being aluminum foil and the other side of the facer being brown paper. When the mold is open, the paper side faces the internal part of the mold. Once foam was made, the brown paper side of the facer was in contact with the foam surface. The minimum fill of the mold was defined as the minimum weight of foaming material capable of filling the whole mold including its corners. Foams that are 20% over-pack means foam parts made with 20% higher foaming mass than the minimum fill mass required to fill all mold space including its corners. These 20% overpack foam were made and used for the adhesion testing. When making foam pads for actual adhesion testing, a paper/aluminum foil facer was used in lamination pads covering the top and bottom of the mold. Regular aluminum foil was used to cover the sides of the mold. Based on the formulation in table 1, catalyst use level in Table 2, and the needed foaming mass to make 20% overpack foam, a mixture of premix-1, premix-2 and catalyst was prepared in a 1.89 L paper cup according to the same procedure described in example 11. After mixing, the foaming mass was poured into the mold and the mold lid was then closed to make the foam pad. After the 20% over-pack foam pad was made, the foam pad was removed from the mold after 12 minutes (12 minute de-mold time). After foam pad was de-molded, it was stored at constant temperature and humidity (20° C. and 50% humidity) conditions for approximately 24 hours. Foam pad were cut into samples that are 3.8 cm wide and 10-15 cm long for adhesion testing. Roughly 5 cm from the sides of the foam pad was cut away and discarded. Test samples came from the center of the foam block. Testing was done using a force-to-crush (FTC) machine. The indenter plate of the machine was removed. A spring scale (the scale set was ordered from MiniScience.com with a force range from 250 g to 5,000 g) was hung from a hook on the FTC machine and clipped to the top of the foam facer. Machine was turned on at 0.7 speed setting. Facer was pulled off of foam by spring scale and adhesion was measured by the reading on that scale. The unit of the reading is gram. Because the width of the foam sample is 3.8 cm, we used g/3.8 cm as the unit to denote the force required to pull the facer from the foam surface. Cohesive failure between the paper and aluminum foil due to adhesion to foam (paper side of facer being held onto the foam surface while aluminum foil being peeled off from paper) indicated good adhesion and the maximum force recordable. The result was summarized in Table 3.

TABLE 3

Testing Result in Lamination Formulation

| Catalyst | Adhesion (g/3.8 cm) | Observations |
|---|---|---|
| Dabco ®2039 | 800 | Paper facer failure, excellent adhesion. |
| BDMA | 1160 | Paper facer failure, excellent adhesion. |
| Polycat ®77 | 157 | Poor adhesion |
| Polycate ®5 | 0 | Poor adhesion |
| Amicure ®AMI-1 | 372 | Paper facer failure, excellent adhesion. |
| Product 1B | 1033 | Paper facer failure, excellent adhesion. |
| Product 2 | 883 | Paper facer failure, excellent adhesion. |
| Product 3 | 973 | Paper facer failure, excellent adhesion. |
| Product 4 | 923 | Paper facer failure, excellent adhesion. |
| Product 5 | 920 | Paper facer failure, excellent adhesion. |
| Product 6 | 1033 | Paper facer failure, excellent adhesion. |
| Catalyst 7 | 587 | No facer failure, but good adhesion. |

Examples 18 and 19 describe the method and result of adhesion testing by using a spray formulation in spray booth.

Example 18

Use Levels for Spray Foam Formulations

A typical high density closed cell spray foam formulation is shown in Table 4. The catalysts of the invention are used in this example together with conventional gelling and blowing catalysts typically used to make spray foam. Catalysts of the invention were combined with the components shown in the formulation of Table 4. Optimum loading for the catalysts of the invention were determined using a FOMAT sonar device equipped with software version 3.71 that can record height (mm) vs. time (seconds) and catalysts use levels (pphp) were obtained when matching of these curves were obtained. 500 g of premix sample was prepared with all formulation components except for the adhesion promoter catalyst and MDI in a 500 mL Nalgene bottle. About 60 g of resin (resin means a mixture of all component in the formulation except MDI) was prepared in a 120 mL Nalgene bottle by adding to the premix the corresponding amount of the catalysts of the invention or alternatively the corresponding standards DMI or Imicure® AMI-1 followed by shaking for ~30 seconds. Resin (30 g) was transferred to a 950 mL paper cup and 30 g of MDI was quickly added to the contents of the paper cup. The mixture was then mixed using a Premier Mill Cort series 2000 laboratory dispersator at >2000 rpm for 3 seconds with a 5 cm high-shear mixer rotating blade. The foaming mass was placed under the Format sonar equipment (Format Messtechnik GmbH), which recorded the foam height (mm) as a function of time (seconds). Loadings of the catalysts of the invention were determined by matching the time in which the foam height reaches 50% of its maximum height relative to a standard formulation having 1% DMI (1,2-dimethylimidazole) and time error of +/−0.5 seconds. Table 5 shows the use levels for each product tested as well as the time to reach 50% maximum height.

TABLE 4

Rigid Adhesion Spray Formulation

| Component | pphp | Wt % | Notes |
|---|---|---|---|
| Terol ®305 | 50.00 | 35.6 | Polyester polyol with OH value 305 supplied by Huntsman |
| Jeffol ®R-470x | 50.00 | 35.6 | Mannich based polyether polyol with OH value 470 supplied by Huntsman |
| Fyrol ®PCF | 21.50 | 15.3 | Tris(2-chloroisopropyl) phosphate flame retardant supplied by ICL Industrial Products |
| Dabco ®DC193 | 1.40 | 1.00 | Silicone surfactant supplied by Evonik |
| Polycat ®5 | 1.00 | 0.71 | Pentamethyldiethylenetriamine supplied by Evonik |
| DABCO ®MB20 | 0.15 | 0.11 | Bismuth-based gel catalyst supplied by Evonik |
| Enovate ®245fa | 15.00 | 10.7 | Blowing agent 1,1,1,3,3-pentafluoropropane supplied by Honeywell |
| Deionized Water | 1.50 | 1.07 | |
| Catalyst | varied | varied | |
| Rubinate ®M | | 100 | MDI supplied by Huntsman |

TABLE 5

Adhesion Promoter Use Levels

| Adhesion Promoter | Note | Wt % in Formulation | 50% Rise Time (s) |
|---|---|---|---|
| DMI | 1,2-Dimethylimidazole supplied by Evonik | 1% | 6.8 |
| Product 1B | Product of example 4 | 1% | 7.3 |
| Product 5 | Product of example 8 | 1% | 7.3 |
| Product 6 | Product of example 9 | 2% | 7.3 |
| Imicure ®AMI-1 | 1-Methylimidazole supplied by Evonik | 1.5% | 7.0 |
| Product 8 | Product of example 11 | 1% | 7.8 |
| Product 10 | Product of example 13 | 1% | 7.7 |

Example 19

Adhesion Testing of Spray Foam on Plywood

About 11 liters of premix-3 was made by combining all formulation components in Table 4 except MDI in a 19-liter pail and mixing thoroughly. Premix-3 was then pumped through the equipment lines and spray hosed to flush the equipment prior to spraying. Spray tests were conducted using premix-3 and MDI with hose temperatures set at 49° C. and dynamic pressure at 9-11 Mpa. All formulations were sprayed using a Graco HV-R Variable Ratio Proportioner with the premix-3 and MDI side volumes set at 1:1 ratio. A Graco air-purge fusion gun was used with mix chamber size AR 4242. All sprays were conducted in a cold room with temperature either at −1° C. or −6° C. Substrates were allowed to equilibrate overnight to the cold room temperature. Plywood boards (1.6 cm thick) were previously sanded to provide a consistent smooth surface. The surfaces were wiped clean of any excess debris prior to spraying. To prepare samples for adhesion testing, foam rounds were shot onto plywood boards (30.5 cm×30.5 cm×1.6 cm) by holding the gun trigger for ~3 seconds directly above the board. Foam boards were allowed to cure in the cold room (−1° C. or −6° C.) overnight. Samples were then cut into three 3.8 cm cubes and metal coupons were glued to the foam and plywood ends. Samples were inserted into an Instron model 5565 with 1 kN load cell, then pulled apart at 0.65 mm/min according to a procedure outlined by ASTM 1623; the maximum load to cause breakage was recorded. The foam separated off from plywood board cleanly during all test. For each evaluation, a base formulation was sprayed as a negative control (a negative control means a formulation that was sprayed on the surface according to the components listed in Table 4 but containing no DMI or catalysts of the invention) or as a positive control (a positive control means a formulation that was sprayed on the surface according to the components listed in Table 4 but containing DMI). The positive and negative controls were needed to achieve a reliable comparison among all the products tested and to minimize variations due to operator, relative humidity or any other unforeseen factor. The results (shown below in Table 6) were normalized to a standard formulation having DMI as a reference. Product 1B, 5 and 10 showed similar/better adhesion compared to DMI. Amine emission of the foams made with DMI standard, Product 1B and Product 5 were tested using microchamber method (WK 40293). The results were shown below in Table 7, and there was no amine emission detected in the foams made from Product 1B and Product 5, while foam made with DMI showed DMI emission.

TABLE 6

Evaluation of Adhesion Promoters

| Catalyst | Environment Temp. (° C.) | Max Load (kg)[1] | Positive Control Max Load (kg)[2] | Max Load Normalized to Positive Control |
|---|---|---|---|---|
| Product 1B | −1 | 34.38 | 34.67 | 34.38 ÷ 34.67 = 0.99 |
| Product 1B | −6 | 13.49 | 13.31 | 13.49 ÷ 13.31 = 1.01 |
| Product 5 | −1 | 34.35 | 34.67 | 34.35 ÷ 34.67 = 0.99 |
| Product 5 | −6 | 22.82 | 13.31 | 22.82 ÷ 13.31 = 1.71 |
| Product 6 | −1 | 46.15 | 51.92 | 46.15 ÷ 51.92 = 0.89 |
| Imicure ®AMI-1 | −1 | 48.33 | 51.92 | 48.33 ÷ 51.92 = 0.93 |
| Product 8 | −1 | 30.27 | 47.11 | 30.27 ÷ 47.11 = 0.64 |
| Product 10 | −1 | 54.04 | 47.11 | 54.07 ÷ 47.11 = 1.15 |

[1]Represents the load needed to detach the foam specimen from the wooden surface using Instron equipment model 5565 for products 1B, 5, 6, 8, 10 and Imicure ®AMI-1 according to foam made with formulation of Table 4 in the absence of DMI (1,2-dimethylimidazole).
[2]Represents the load needed to detach the foam specimen from the wooden surface using Instron equipment model 5565 for foam made with formulation of Table 4 using DMI (1,2-dimethylimidazole) as adhesion promoting catalyst.

TABLE 7

Amine Emissions of Spray Foams

| Catalyst | Target Compound | Area Specific Emission Rate (ug/m$^2$hr) after 2 hours |
|---|---|---|
| DMI | DMI | 39 |
| Product 1B | N,N-dimethylaminopropylimidazole | Not Detected |
| Product 5 | N,N-dimethylaminopropylimidazole and N,N-bis-(3-imidazolylpropyl)-N-methylamine | Not Detected |

Examples 20 through 22 describe the method and result of HFO stability testing of amine catalysts and acid blocked amine catalysts

Example 20

Rate-of-Rise Method for Catalyst Use Level Determination

Two formulations (formulation 1 in Table 10 and formulation 2 in Table 11) were used to test catalyst stability of the blowing agent trans-1-chloro-3,3,3-trifluoropropene. The first step was to determine the use level in pphp of the different catalysts so the reactivity rate is matched. First, 1,300 g of premix-4 for formulation 1 (Table 10) and 1,300 g of premix-5 for formulation 2 (Table 11) were prepared by mixing polyols, surfactant, flame retardant, and if necessary processing aid, in a 1.89 L Nalgene bottle according to the part numbers in Table 8 and Table 9 respectively. The premixes in the bottle were vigorously shaked by hand for about 30 seconds. Two fully formulated resins (resin means a mixture of all components in the formulation except MDI) were then prepared for each individual catalyst in a 125 mL Nalgene bottle by shaking a 125 g mixture containing premix, catalyst, water and blowing agent according to the weight percentage shown in Table 10 and Table 11 respectively for 30~60 seconds until they were thoroughly mixed. The weight percentages of water, blowing agent and isocyanate were kept constant as shown in Table 10 and Table 11. When the catalyst use level was increased, the use level of the premix-4 and premix-5 were decreased accordingly. Next, 30 g of fully formulated resin was weighed into a 1.89 L paper cup, and then 33 g Rubinate M was quickly added into the paper cup. Resin and MDI were mixed using a 7.6 cm mixing blade at roughly 10,000 rpm using an Indco Mixer, model HSL-4 for 3 seconds. After mixing, the cup was immediately placed under the Fomat sonar equipment (Format Messtechnik GmbH) and the height formation was recorded for 60 seconds using FOAM software version 3.71/17, producing a rate of rise profile. The time of the foam to reach 80% maximum height of each catalyst was compared with that of the foam produced by the control catalyst package containing Standard-1 (standard-1 was a mixture containing 55% tris(dimethylaminopropyl)amine, 25% dimethyl-hexadecylamine and 20% pentamethyldiethylenetriamine) and Dabco® T120. The use level of each catalyst was shown in Table 12 and the difference of activity was controlled under 36% for formulation 1 and under 29% for formulation 2. The corresponding rise time at 80% maximum foam height can be found in Table 13 under column "Initial".

TABLE 8

Premix-4 of High Density HFO Spray Foam Formulation 1

| Component | Part | Notes |
|---|---|---|
| Terate ®HT5100 | 42.35 | Aromatic Polyester Polyol with 290-310 OH Value Supplied by Invista |
| Jeffol ®SG-360 | 17.65 | Sucrose/Glycerine based polyether polyol with 350-370 OH Value supplied by Huntsman |
| Jeffol ®R470X | 17.65 | Nonyl-phenol initiated (Mannich) based polyether polyol with 415-435 OH value supplied by Huntsman |
| Saytexe ®RB-79 | 14.71 | Reactive bromine-containing diester/ether diol of tetrabromo-phthalic anhydride flame retardant supplied by Albemarle |
| Fyrol ®PCF - TCPP | 4.12 | Tris(2-chloroisopropyl) phosphate flame retardant supplied by ICL Industrial Products |
| Dabco ®DC193 | 1.18 | Silicone surfactant supplied by Evonik |

TABLE 9

Premix-5 of High Density HFO Spray Foam Formulation 2

| Component | pphp | Notes |
|---|---|---|
| Terol ®305 | 70.00 | Modified aromatic polyester polyol with 290-310 OH value supplied by Huntsman |
| Jeffol ®R470X | 30.00 | Nonyl-phenol initiated (Mannich) based polyether polyol with 415-435 OH value supplied by Huntsman |
| Fyrol ®PCF - TCPP | 21.50 | Tris(2-chloroisopropyl) phosphate flame retardant supplied by ICL Industrial Products |
| Dabco ®DC193 | 0.64 | Silicone surfactant supplied by Evonik |
| Dabco ®PM301 | 3.00 | Processing Aid supplied by Evonik |

TABLE 10

High Density HFO Spray Foam Formulation 1

| Component | Wt % | Notes |
|---|---|---|
| Premix-4 | (87.26-X) % | Silicone surfactant supplied by Evonik |
| Catalyst | X % | See Table 12 |
| Solstice LBA | 10.68% | Blowing Agent supplied by Honeywell |
| Water | 2.06% | |
| Rubinate M | 110% | Polymeric MDI supplied by Huntsman |

TABLE 11

High Density HFO Spray Foam Formulation 2

| Component | Wt % | Notes |
|---|---|---|
| Premix-5 | (91.04-X) % | Silicone surfactant supplied by Evonik |
| Catalyst | X % | See Table 12 |
| Solstice LBA | 7.17% | Blowing Agent supplied by Honeywell |
| Water | 1.79% | |
| Rubinate M | '2110% | Polymeric MDI supplied by Huntsman |

TABLE 12

Catalyst Use Levels X %

| Catalyst | | Formulation 1 Wt % | Formulation 2 Wt % | Note |
|---|---|---|---|---|
| Control catalyst package | Standard | 1.40% | 1.00% | A mixture of 55% tris(dimethylaminopropyl)amine and 25% dimethylhexadecylamine and 20% pentamethyldiethylenetriamine |
| | Dabco ®T120 | 0.35% | 0.25% | Dibutyltin-Bis-(Laurylmercaptide) tin catalyst supplied by Evonik |
| | Dabco ®2040 | 5.25% | 3.73% | 70% solution of 1,2-dimethylimidazole in diethylene glycol |
| | Product 1B | 5.75% | 4.08% | Product of Example 4 |
| | Product 2 | 10% | 7.1% | Product of Example 5 |

TABLE 12-continued

Catalyst Use Levels X %

| Catalyst | Formulation 1 Wt % | Formulation 2 Wt % | Note |
|---|---|---|---|
| Product 6 | 11.25% | 8% | Product of Example 9 |
| Product 7 | 17.15% | 12% | Product of Example 10 |

TABLE 13

Rise Time at 80% Max Height [sec]

| | Catalyst | Initial | Aged 2 weeks | Aged 3 weeks | Aged 4 weeks | Δ (4 week-Initial) |
|---|---|---|---|---|---|---|
| Formulation 1 | Control | 11.7 | 37.8 | 67.4 | 71 | 59.3 |
| | Dabco ® 2040 | 13.4 | 13.6 | 13.9 | 13 | −0.4 |
| | Product 1B | 14 | 15 | 16.4 | 17 | 3 |
| | Product 2 | 11.4 | 11.8 | 11.6 | 12.9 | 1.5 |
| | Product 6 | 15.8 | 17.2 | 16.6 | 16.7 | 0.9 |
| | Product 7 | 13.6 | 14.5 | 14 | 13.6 | 0 |
| Formulation 2 | Control | 12.8 | 50.5 | 53.8 | 57.1 | 44.3 |
| | Dabco ® 2040 | 13.7 | 14.1 | 15 | 14.1 | 0.4 |
| | Product 1B | 13.2 | 14.7 | 14.8 | 15.6 | 2.4 |
| | Product 2 | 12.5 | 13.3 | 13.7 | 13 | 0.5 |
| | Product 6 | 16.4 | 17.7 | 17.6 | 17.9 | 1.5 |
| | Product 7 | 15.6 | 16.2 | 16 | 15.6 | 0 |

Example 21

HFO Stability Study of Amine Catalysts

Use the formulations in Table 10 and 11, and the catalyst use levels in Table 12 to study the HFO stability. For preparation of fully formulated resin for aging, premix, catalyst, water, and Solstice LBA were blended in a 500 mL Nalgene bottle. The resin was then packaged in four 125 mL Nalgene bottles. For each different catalyst package one bottle was used to determine the initial reactivity, while the remaining three bottles were placed in a Blue-M oven, model EM-366FX at 50° C. for heat aging. One bottle, for each catalyst, was removed from the oven at an interval of 2, 3, and 4 weeks after aging start date. The heat aged samples were allowed to equilibrate to room temperature before testing, standardizing the test method. Measuring the rate of rise profile was done by using the same procedure described in example 20. Triplicate measurements were taken for each catalyst for each aging condition. The time required for the foam to achieve 80% max height is used to compare the initial samples to those that were heat aged, and results were shown in Table 13. The difference between the initial and 4 week aged sample was used to determine stability. Typically a difference of <5 seconds is considered stable mixture suitable for spray foam use and the lower the difference the better the stability. Thus, the catalyst of the invention can provide excellent catalytic activity without degradation of the system allowing the storage of the resin over longer periods of time.

Example 22

HFO Stability Study of Acid Blocked Amine Catalysts

In order to evaluate the catalytic activity and HFO stability of acid blocked amine catalyst, Product 11 and 12 were tested using formulation 2 in example 20. The testing method was the same as shown in example 20 and 21. The catalyst use level of these two materials and Dabco®2040 were shown in Table 14, while the stability data was summarized in Table 15. Both materials showed similar HFO stability over 4 weeks aging at 50° C. compared to the Dabco®2040 as a control.

TABLE 14

Catalyst Use Levels X %

| Catalyst | Formulation 2 Wt % | Note |
|---|---|---|
| Dabco ®2040 | 5% | 70% solution of 1,2-dimethylimidazole in diethylene glycol |
| Product 11 | 5.25% | Product of Example 14 |
| Product 12 | 8.5% | Product of Example 15 |

TABLE 15

Rise Time at 80% Max Height [sec]

| | Catalyst | Initial | Aged 2 weeks | Aged 3 weeks | Aged 4 weeks | Δ (4 week-Initial) |
|---|---|---|---|---|---|---|
| Formulation 2 | Dabco ® 2040 | 10.6 | 12.4 | 13.0 | 13.4 | 2.8 |
| | Product 11 | 12.6 | 14.5 | 15.7 | 16.6 | 4.0 |
| | Product 12 | 11.6 | 16.0 | 15.7 | 17.3 | 5.7 |

Example 23 describes the method and result of making spray polyurethane foams followed by physical property testing

Example 23

Two spray foams were made using the formulation 2 shown in Table 11 according to the method described in example 19, but sprayed at room temperature instead of in a cold room. Two catalyst packages, package-1 and package-2, were used for the two spray foams respectively. The use level of the two catalyst packages and their corresponding compositions were summarized in Table 16. Physical properties of the two foam samples including density, closed cell percentage and friability were measured according to corresponding ASTM methods. The properties, methods and results were summarized in Table 17. The foam made with catalyst package-1 containing Product 5 showed similar density and closed cell percentage, but improved friability compared to the foam made with catalyst package-2 containing DMI.

TABLE 16

Information of Catalyst Packages

| Catalyst | Total wt % | Component | wt % |
|---|---|---|---|
| Package-1 | 4.35% | Product 5 | 1.05% |
| | | 2-[[2-[2-(Dimethylamino)ethoxy]ethyl]methylamino]ethanol | 0.42% |
| | | 1,1,3,3-Tetramethylguanidine | 1.11% |
| | | Succinic acid | 0.64% |
| | | Ethylene glycol | 0.57% |
| | | Water | 0.56% |
| Package-2 | 2.63% | DMI | 0.74% |
| | | Polycat ®5 | 0.28% |
| | | Tris(N,N-dimethylaminopropyl)amine | 0.77% |
| | | N,N-Dimethylhexadecylamine | 0.35% |
| | | Dabco ®T120 | 0.18% |
| | | Diethylene glycol | 0.31% |

TABLE 17

Physical Properties of Foam Samples

| | Density (kg/m$^{-3}$) ASTM D2126 | % Closed Cell ASTM D2856 | Friability (% mass loss after 2 cycles) ASTM C421-05 |
|---|---|---|---|
| Package-1 | 32.52 | 93.2775 | 0.42 |
| Package-2 | 33.96 | 92.2398 | 1.62 |

Example 24 and 25 describe the method and result of making flexible polyurethane foams followed by physical properties and emission testing

Example 24

Making Flexible Polyurethane Foams Using Polyester Slabstock Formulation

Using the polyester slabstock formulation shown in Table 18 at a 3.5 times scale, a water-amine blend was prepared in a 25 mL glass beaker by mixing Dabco 33-LV and water, totaling 12.46 g. In a separate, 0.25 L paper can, the polyol, silicone surfactant and the isocyanate totaling 504.39 g, were mixed for 25 seconds with a 7.6 cm mixing blade at roughly 1000 rpms using an Indco Mixer, model HSL-4. The water-amine blend was added to the paper can and each individual catalyst was weighed into the 0.25 L paper can (the weight of catalyst varied and the final use level of each catalyst that provided matched activity was summarized in Table 19) and mixed for 6 seconds using the same blade at roughly 5000 rpms. This mixture was then poured into a paper bucket (the bucket has a height of 20.2 cm and a bottom diameter of 15.5 cm and the top diameter is 21.8 cm) centered under the FOMAT sonar equipment (Format Messtechnik GmbH) with standard software, to measure the change in height (mm) vs time (seconds) using FOAM software version 3.5/10. Using the FOMAT software, top of the cup (TOC) can be measured in seconds once the foaming mass reaches the top edge of the bucket.

TABLE 18

Polyester Slabstock Formulation

| Component | pphp | Notes |
|---|---|---|
| Diexter-G, TF52 Polyol | 100.00 | Saturated polyester polyol supplied by COIM |
| Dabco ®DC I990 | 0.50 | Silicone surfactant supplied by Evonik |
| Water | 3.40 | |
| Dabco ®33-LV | 0.16 | 33% Triethylenediamine in dipropylene glycol supplied by Evonik |
| Catalyst | Varied | |
| Mondur ®TD 80 Grade A | 43.61 | TDI supplied by Covestro |

Full rise height (FRH) was measured to be the highest point on the rise profile in mm at the Full rise time (FRT) recorded in seconds. Final height (FHT) was measured and percentage recession (% R) was calculated. Dabco®2039 was the standard catalyst for the formulation in Table 18 and the use level of Dabco®2039 was 0.60 pphp. The use levels in pphp for the experimental catalysts were adjusted to obtain similar FRT compared to Dabco®2039.

TABLE 19

Catalyst Use Level to Obtain similar Rise Profile

| Catalyst | pphp | Note | FRT, sec | FRH, mm | % R |
|---|---|---|---|---|---|
| Dabco ®2039 | 0.6 | 50% DMI in dipropylene glycol supplied by Evonik | 83.5 | 189.0 | 1.7 |
| Product 1B | 0.4 | Product of example 4 | 86.3 | 194.3 | 0.6 |
| Product 5 | 0.5 | Product of example 8 | 81.4 | 193.5 | 0.2 |
| Product 8 | 0.7 | Product of example 11 | 83.7 | 190.6 | 0.7 |
| Product 9 | 0.7 | Product of example 12 | 95.4 | 191.6 | 0.3 |

Example 25

Physical Properties and Emission Testing

Acceptable polyester slabstock foams were prepared with four catalysts of the invention compared to the Dabco®2039 industry control. All four catalysts demonstrated similar foam rise profiles. Product 1B and Product 5 showed stronger catalytic activity compared to Dabco®2039, as illustrated by their use levels in Table 19. Foam physical properties were evaluated via standard ASTM D3574 test protocols. Results were summarized in Table 20. All physical properties of the foams made with experimental catalysts were comparable to the foam made with Dabco®2039. Significant improvements to elongation was observed with Product 1B.

TABLE 20

Foam Physical Properties (ASTM D3574)

| Catalyst | Airflow, m³/s | Density, kg/m³ | Tear, N/m | Tensile, kpa | Elongation, % |
|---|---|---|---|---|---|
| Dabco ®2039 | 0.00025 | 31.32 | 518 | 136.2 | 155 |
| Product 1B | 0.00029 | 31.32 | 471 | 125.8 | 189 |
| Product 5 | 0.00023 | 31.22 | 468 | 122.8 | 160 |
| Product 8 | 0.00021 | 30.98 | 506 | 127.3 | 164 |
| Product 9 | 0.00035 | 29.78 | 464 | 109.1 | 148 |

Foams made with Product 9 and standard Dabco®2039 were tested using thermal deposition to evaluate the amine emission. The result was summarized in Table 21. Two emission tests were conducted by cutting approximately 27 mg of foam from the core of each foam sample using a clean razor knife. The foam was individually weighed and inserted into a ¼" OD×3½" long glass thermal desorption tube. Each tube was then heated to 37° C. (99 F) for 30 minutes under helium. Compounds emitted from the foam sample and were collected at the Gerstel GC inlet for further separation using an HP Ultra 2 GC-MS column. Individual compounds were then detected by the MS detector in a similar way as compared to ASTM D6196 and ISO 16000-6 standard methods. Compound identification and quantification utilized mass fractionation patterns of the compounds and were obtained by liquid injections of each material standard as well as standard library comparisons. Estimated detection limit for N,N-bis-(3-imidazolylpropyl)-N-methylamine is 0.9ng per gram of foam sample, and 12ng per gram foam sample for N,N,N,-tris-(3-imidazolylpropyl)-amine. DMI was detected from the foam made with Dabco®2039 and the emission is 602 µg per gram of foam sample average of two samples (482 µg/g and 722 µg/g). Two major amine components of Product 9 were not detected in the test and there was no amine emission from the foam made with Product 9.

TABLE 21

Amine Emissions of Slabstock Foams

| Catalyst | Target Amine Molecules | Amine Emission (µg/g) |
|---|---|---|
| Dabco ®2039 | DMI | 602 |
| Product 9 | N,N-bis-(3-imidazolylpropyl)-N-methylamine | 0 |
| | N,N,N,-tris-(3-imidazolylpropyl)-amine | 0 |

While the invention has been described with reference to certain aspects or embodiments, it will be understood by those skilled in the art that various changes may be made and equivalents may be substituted for elements thereof without departing from the scope of the invention. In addition many modifications may be made to adapt the teachings of the invention without departing from the essential scope thereof. Therefore it is intended that the invention not be limited to the particular embodiment disclosed as the best mode contemplated for carrying out this invention but that the invention will include all embodiments falling within the scope of the appended claims.

The invention claimed is:

1. A composition comprising a contact product of at least one active hydrogen-containing compound, at least one polyisocyanate, at least one blowing agent, at least one additive, and a catalyst composition, wherein the catalyst composition comprises a combination of a first compound and a second compound, wherein the first compound is selected from the group consisting of:

(a). a compound with a general formula $R^1R^2R^3N$ wherein each of $R^1$, $R^2$ and $R^3$ is a moiety according to formula (I):

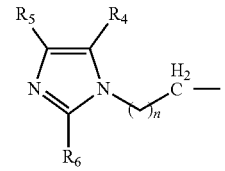

wherein n=1 to 5; and $R^4$, $R^5$ and $R^6$ are each hydrogen; and (b). a compound with a general formula $R^1R^2R^3N$ wherein each of $R^1$ and $R^2$ is a moiety according to formula (I):

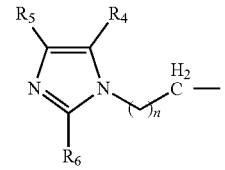

wherein n=1 to 5; $R^4$, $R^5$ and $R^6$ are each hydrogen; and $R^3$ is hydrogen, $C_1$-$C_6$ alkyl group, cycloalkyl, alkenyl, alkynyl, aryl, or aralkyl, any of which are substituted or unsubstituted;

wherein the second compound is selected from the group consisting of (a), (b), and (c). a compound with a general formula $R^1R^2R^3N$ wherein $R^1$ is a moiety according to formula (I):

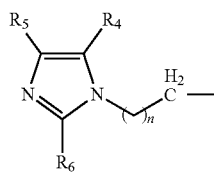

wherein n=1 to 5; $R^4$, $R^5$ and $R^6$ are each hydrogen; and $R^2$ and $R^3$ are each independently hydrogen, $C_1$-$C_6$ alkyl group, cycloalkyl, alkenyl, alkynyl, aryl, or aralkyl, any of which are substituted or unsubstituted;

and wherein the first compound and the second compound are optionally blocked with a carboxylic or sulfonic acid.

2. The composition of claim 1, wherein the contact product further comprises a tertiary amine.

3. The composition of claim 1, wherein the at least one additive is selected from the group consisting of cell stabilizer, flame retardant, chain extender, epoxy resin, acrylic resin, filler, and pigment.

4. The composition of claim 1, wherein the catalyst composition is present in amounts from about 0.05 to about 20 parts by weight per hundred weight parts of the at least one active hydrogen-containing compound.

5. A polyurethane flexible foam product formed from the composition of claim 1.

6. A polyurethane rigid foam product formed from the composition of claim 1.

7. A method for preparing a polyurethane foam by reacting an organic polyisocyanate and a polyol in the presence of a blowing agent, a cell stabilizer and a catalyst composition, wherein the catalyst composition comprises a combination of a first compound and a second compound, wherein the first compound is selected from the group consisting of:

(a). a compound with a general formula $R^1R^2R^3N$ wherein each of $R^1$, $R^2$ and $R^3$ is a moiety according to formula (I):

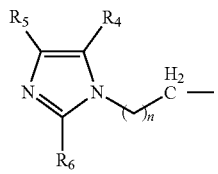

wherein n=1 to 5; and $R^4$, $R^5$ and $R^6$ are each hydrogen; and (b). a compound with a general formula $R^1R^2R^3N$ wherein each of $R^1$ and $R^2$ is a moiety according to formula (I):

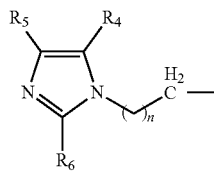

wherein n=1 to 5; $R^4$, $R^5$ and $R^6$ are each hydrogen; and $R^3$ is hydrogen, $C_1$-$C_6$ alkyl group, cycloalkyl, alkenyl, alkynyl, aryl, or aralkyl, any of which are substituted or unsubstituted;

wherein the second compound is selected from the group consisting of (a), (b), and (c). a compound with a general formula $R^1R^2R^3N$ wherein $R^1$ is a moiety according to formula (I):

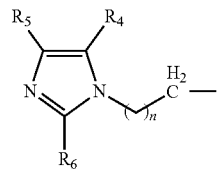

wherein n=1 to 5; $R^4$, $R^5$ and $R^6$ are each hydrogen; and $R^2$ and $R^3$ are each independently hydrogen, $C_1$-$C_6$ alkyl group, cycloalkyl, alkenyl, alkynyl, aryl, or aralkyl, any of which are substituted or unsubstituted;

and wherein the first compound and the second compound are optionally blocked with a carboxylic or sulfonic acid.

8. The method of claim 7, wherein the first compound is a compound with a general formula $R^1R^2R^3N$ wherein each of $R^1$ and $R^2$ is a moiety according to formula (I):

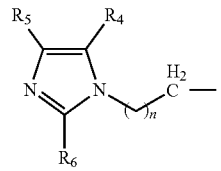

wherein n=1 to 5; $R^4$, $R^5$ and $R^6$ are each hydrogen; and $R^3$ is hydrogen, $C_1$-$C_6$ alkyl group, cycloalkyl, alkenyl, alkynyl, aryl, or aralkyl, any of which are substituted or unsubstituted.

9. The method of claim 7, wherein the second compound is a compound with a general formula $R^1R^2R^3N$ wherein $R^1$ is a moiety according to formula (I):

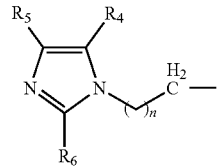

wherein n=1 to 5; $R^4$, $R^5$ and $R^6$ are each hydrogen; and $R^2$ and $R^3$ are each independently hydrogen, $C_1$-$C_6$ alkyl group, cycloalkyl, alkenyl, alkynyl, aryl, or aralkyl, any of which are substituted or unsubstituted.

10. The method of claim 7, wherein the first compound is selected from the group consisting of N,N-bis(3-imidazolylpropyl) amine, N,N-bis(3-imidazolylpropyl)-N-methyl-amine, N,N-bis(3-imidazolylpropyl)-N-ethyl-amine, N,N-bis(3-imidazolylpropyl)-N-propyl-amine, N,N-bis(3-imidazolylpropyl)-N-butyl-amine, N,N-bis(3-imidazolylpropyl)-N-pentyl-amine, N,N-bis(3- imidazolylpropyl)-N-hexyl-amine, N,N,N-tris(3-imidazolylpropyl)-amine, and combinations thereof.

11. The method of claim 10, wherein the second compound is selected from the group consisting of N-(3-aminopropyl)-imidazole, N,N-dimethylaminopropylimidazole, and N-(3-imidazolylpropyl)-N-benzyl-N-methyl-amine.

12. The method of claim 7, wherein the catalyst composition further comprises at least one tertiary amine having at least one isocyanate reactive group comprising a primary hydroxyl group, a secondary hydroxyl group, a primary amine group, a secondary amine group, a urea group or an amide group.

13. The method of claim 12, wherein the tertiary amine is selected from the group consisting of N, N-bis(3-dimethylaminopropyl)-N-isopropanolamine, N, N-dimethylaminoethyl-N'-methyl ethanolamine, N, N, N'-trimethylaminopropylethanolamine, N, N-dimethylethanolamine, N, N-diethylethanolamine N, N-dimethyl-N', N'-2-hydroxy(propyl)-1,3-propylenediamine,dimethylaminopropylamine, (N, N-dimethylaminoethoxy) ethanol, methyl-hydroxyethyl-piperazine, bis(N, N-dimethyl-3-aminopropyl) amine, N, N-dimethylaminopropyl urea, diethylaminopropyl urea, N, N'-bis(3-dimethylaminopropyl)urea, N, N'-bis(3-diethylaminopropyl)urea, bis(dimethylamino)-2-propanol, 6-dimethylamino-1-hexanol, N-(3-aminopropyl) imidazole), N-(2-hydroxypropyl) imidazole, N-(2-hydroxyethyl) imidazole, 2-[N-(dimethylaminoethoxyethyl)-N-methylamino] ethanol, N, N-dimethylaminoethyl-N'-methyl-N'-ethanol, dimethylaminoethoxyethanol, N, N, N'-trimethyl-N'-3-aminopropyl-bis(aminoethyl) ether, and combinations thereof.

14. The method of claim 7, wherein the first compound and second compound are acid blocked with a carboxylic or sulfonic acid.

15. The method of claim 14, wherein the first compound and second compound are acid blocked with an acid selected from the group consisting of formic acid, acetic acid, propionic acid, butanoic acid, pentanoic acid, neopentanoic acid, hexanoic acid, 2-ethylhexyl carboxylic acid, neohexanoic acid, octanoic acid, neooctanoic acid, heptanoic acid, neoheptanoic acid, nonanoic acid, neononanoic acid, decanoic acid, neodecanoic acid, undecanoic acid, neoundecanoic acid, dodecanoic acid, neododecanoic acid, myristic acid, pentadecanoic acid, hexadecanoic acid, heptadecanoic acid, octadecanoic acid, benzoic acid, oxalic acid, malonic acid, succinic acid, glutaric acid, adipic acid, pimelic acid, suberic acid, azelaic acid, sebacic acid, glycolic acid, lactic acid, tartaric acid, citric acid, malic acid, and salicylic acid.

16. The method of claim 14, wherein the catalyst composition further comprises an additional catalytic material.

17. The method of claim 16, wherein the additional catalytic materials are selected from the group consisting of potassium acrylate, tetramethylammonium acrylate, tetraethylammonium acrylate, tetrapropylammonium acrylate, tetrabutylammonium acrylate, potassium methacrylate, tetramethylammonium methacrylate, tetraethylammonium methacrylate, tetrapropylammonium methacrylate, tetrabutylammonium methacrylate, mono-potassium fumarate, bis-potassium fumarate, mono-tetramethylammonium fumarate, bis-tetramethylammonium fumarate, potassium tetramethylammonium fumarate, mono-tetraethylammonium fumarate, bis-tetraethylammonium fumarate, potassium tetraethylammonium fumarate, mono-tetrapropylammonium fumarate, bis-tetrapropylammonium fumarate, potassium tetrapropylammonium fumarate, mono-tetrabutylammonium fumarate, bis-tetrabutylammonium fumarate, potassium tetrabutylammonium fumarate, mono-potassium maleate, bis-potassium maleate, mono-tetramethylammonium maleate, bis-tetramethylammonium maleate, potassium tetramethylammonium maleate, mono-tetraethylammonium maleate, bis-tetraethylammonium maleate, potassium tetraethylammonium maleate, mono-tetrapropylammonium maleate, bis-tetrapropylammonium maleate, potassium tetrapropylammonium maleate, mono-tetrabutylammonium maleate, bis-tetrabutylammonium maleate, potassium tetrabutylammonium maleate, trimethyl(2-hydroxyethyl)ammonium acrylate, triethyl(2-hydroxyethyl)ammonium acrylate, tripropyl(2-hydroxyethyl)ammonium acrylate, tributyl(2-hydroxyethyl)ammonium acrylate, dimethylbenzyl(2-hydroxypropyl)ammonium acrylate, dimethylbenzyl(2-hydroxyethyl)ammonium acrylate, trimethyl(2-hydroxyethyl)ammonium methacrylate, triethyl(2-hydroxyethyl)ammonium methacrylate, tripropyl(2-hydroxyethyl)ammonium methacrylate, tributyl(2-hydroxyethyl)ammonium methacrylate, dimethylbenzyl(2-hydroxypropyl)ammonium methacrylate, dimethylbenzyl(2-hydroxyethyl)ammonium methacrylate, bis-(trimethyl(2-hydroxyethyl)ammonium) maleate, bis-(triethyl(2-hydroxyethyl)ammonium) maleate, bis-(tripropyl(2-hydroxyethyl)ammonium) maleate, bis-(tributyl(2-hydroxyethyl)ammonium) maleate, bis-(dimethylbenzyl(2-hydroxypropyl)ammonium) maleate, bis-(dimethylbenzyl (2-hydroxyethyl)ammonium) maleate, bis-(trimethyl(2-hydroxyethyl)ammonium) fumarate, bis-(triethyl(2-hydroxyethyl)ammonium) fumarate, bis-(tripropyl(2-hydroxyethyl)ammonium) fumarate, bis-(tributyl(2-hydroxyethyl)ammonium) fumarate, bis-(dimethylbenzyl(2-hydroxypropyl)ammonium) fumarate, bis-(dimethylbenzyl (2-hydroxyethyl)ammonium) fumarate, and combinations thereof.

18. The method of claim 16, wherein the additional catalytic material is selected from the group consisting of potassium formate, potassium acetate, potassium propionate, potassium butanoate, potassium pentanoate, potassium hexanoate, potassium heptanoate, potassium octoate, potassium 2-ethylhexanoate, potassium decanoate, potassium butyrate, potassium isobutyrate, potassium nonante, potassium stearate, sodium octoate, lithium stearate, sodium caprioate, lithium octoate, 2-hydroxypropyltrimethylammonium octoate solution, and combinations thereof.

\* \* \* \* \*